United States Patent [19]
Kojima

[11] Patent Number: 5,966,464
[45] Date of Patent: Oct. 12, 1999

[54] CHARACTER RECOGNITION METHOD AND APPARATUS, INCLUDING GENERATION OF A DEGREE OF BELIEF

[75] Inventor: Keiji Kojima, Kawasaki, Japan

[73] Assignee: RCOH Company, Japan

[21] Appl. No.: 08/931,163

[22] Filed: Sep. 16, 1997

Related U.S. Application Data

[63] Continuation of application No. 08/679,995, Jul. 12, 1996, abandoned, which is a continuation of application No. 08/320,374, Oct. 11, 1994, abandoned, which is a continuation of application No. 08/056,606, May 4, 1993, abandoned, which is a continuation of application No. 07/711,064, Jun. 6, 1991, abandoned.

[30] Foreign Application Priority Data

| Jun. 14, 1990 | [JP] | Japan | 2-156318 |
| Jun. 19, 1990 | [JP] | Japan | 2-152345 |
| Dec. 27, 1990 | [JP] | Japan | 2-414876 |

[51] Int. Cl.[6] .................................................. G06K 9/62
[52] U.S. Cl. ........................................ 382/228; 382/304
[58] Field of Search ................................. 382/155, 226, 382/227, 228, 304, 309; 706/52

[56] References Cited

U.S. PATENT DOCUMENTS

| Re. 31,692 | 10/1984 | Tyburski et al. | 382/57 |
| 4,446,531 | 5/1984 | Tanaka | 364/728 |
| 4,747,058 | 5/1988 | Ho | 382/57 |
| 4,760,604 | 7/1988 | Cooper et al. | 382/15 |
| 4,773,099 | 9/1988 | Bokser | 382/14 |
| 4,958,379 | 9/1990 | Yamaguchi et al. | 382/39 |
| 5,052,043 | 9/1991 | Gaborski | 382/14 |
| 5,257,323 | 10/1993 | Melen et al. | 382/39 |
| 5,287,275 | 2/1994 | Kimura | 364/419.01 |

FOREIGN PATENT DOCUMENTS

| 24 35 889 | 1/1978 | Germany . | |
| 61-6430 | 2/1986 | Japan | G06K 9/03 |
| 62-280983 | 12/1987 | Japan | G06K 9/03 |

OTHER PUBLICATIONS

Gail Gong, "Production Systems and Belief Functions", Computer Science and Statistics, 1986, pp. 49–53.

Philip L. Bagler, "Shafer–Demptster Reasoning with Applications to Multisensor Target Identification Systems", IEEE Transactions on Systems, Man and Cyberrotics, vol. SMC–17, No. 6, Nov./Dec. 1987, pp. 968–977.

*Primary Examiner*—Andrew W. Johns

[57] ABSTRACT

A method for recognizing characters includes the steps of: inputting image data; carrying out a recognition process for recognizing each character based on the image data, the recognition process including a plurality of processes, each of the plurality of processes generating a result based on independent information, wherein a recognition result with respect to each character is determined based on the result generated in each of the plurality of processes; generating a degree of belief for the recognition result with respect to each character; and outputting the recognition result and the degree of belief with respect to the recognition result. The step of generating a degree of belief includes the steps of: generating certainty data based on the independent information which is used for generating the result in each of the plurality of processes; combining the certainty data which are generated for results in the plurality of processes with each other; and generating the degree of belief based on the combination data.

40 Claims, 13 Drawing Sheets

今日は、久しぶりに雲一つ
無い良い天気です。
明日は、どうでしょうか？

→ LINE

CHARACTER RECOGNITION METHOD AND APPARATUS, INCLUDING GENERATION OF A DEGREE OF BELIEF

This is a continuation of application Ser. No. 08/679,995, filed Jul. 12, 1996, abandoned which was a continuation of application Ser. No. 08/320,374, filed Oct. 11, 1994, abandoned which was a continuation of application Ser. No. 08/056,606, filed May 4, 1993, abandoned which was a continuation of application Ser. No. 07/711,064, filed Jun. 6, 1991 abandoned.

BACKGROUND OF THE INVENTION

The present invention generally relates to a method and an apparatus for recognizing characters, and more particularly, to a method and an apparatus for recognizing characters by which it is easy for users to appraise recognition results and to revise them.

In a conventional character recognition system, a pattern matching process is carried out so that recognition results are obtained. In the pattern matching process, a character pattern input from an input unit is compared with each reference pattern stored in a dictionary. Then a reference pattern having a low degree of difference from the input character pattern, or a reference pattern having a high degree of similarity to the input character pattern, is output as a recognition result with respect to the input character pattern. However, it is impossible in practice for any character recognition system to obtain a probability of 100% that a recognition result is correct. Thus, it becomes necessary for a user to appraise the recognition results and to revise them.

Conventionally, an optical character recognition apparatus has been proposed, for example, in Japanese Patent Publication No. 61-6430, in which each recognition result is displayed on a display unit and the displayed recognition result is colored in accordance with the degree of similarity of the recognition result to the input character pattern. According to this character recognition system, the user can appraise each of the recognition results based on a corresponding color given to each displayed recognition result.

Further, the following technique has also been proposed.

In a process for recognizing characters, pattern data and feature data for each input character are stored in a memory. Then, when the recognition result obtained by the process for recognizing characters is revised, a learning process for the dictionary to be used for recognizing characters is carried out based on the pattern data and/or the feature data stored in the memory. That is, the contents in the dictionary are updated based on the pattern data and/or the feature data for each input character.

Recently, the number of types and styles of characters which can be written on a document has increased, and the number of cases where characters located on a low quality copy must be recognized has also increased. Thus, it is difficult to increase the recognition rate by only improving the pattern matching process described above. As a result, post processes to be carried out after the pattern matching process have been studied, so that the number of the processes which must be carried out until the recognition result is obtained has increased, and the processes for obtaining the recognition result have become complex. The process for recognizing characters includes, for example, a getting out process for getting an image for one character out of a chain of characters, the pattern matching process, a language process for analyzing the input character pattern based on language rules, and the like.

In the conventional character recognition apparatus in which the processes are carried out in a complicated manner, it is difficult to accurately appraise the recognition result based on only the degree of similarity obtained by the pattern matching process.

SUMMARY OF THE INVENTION

Accordingly, a general object of the present invention is to provide a novel and useful method and apparatus for recognizing characters in which the disadvantages of the aforementioned prior art are eliminated.

A more specific object of the present invention is to provide a method and a system for recognizing characters in which an accurate degree of belief with respect to the recognized result can be given to a user.

The above objects of the present invention are achieved by a method for recognizing characters comprising the following steps (a) to (d) of: (a) inputting image data for a chain of characters; (b) carrying out a recognition process for recognizing each character in the chain of characters based on the image data input by the step (a), the recognition process including a plurality of processes, each of the plurality of processes generating a result based on independent information regarding each character, wherein a recognition result with respect to each character is determined based on the result generated in each of the plurality of processes; (c) generating a degree of belief for the recognition result with respect to each character, the step (c) including steps (1) to (3) of: (1) generating certainty data based on the independent information which is used for generating the result in each of the plurality of processes, the certainty data describing certainty with respect to the result obtained in each of the plurality of processes; (2) combining the certainty data which are generated as results in the plurality of processes by the step (1) with each other, and (3) generating the degree of belief for the recognition result with respect to each character based on a combination data obtained by the step (2); and (d) outputting the recognition result for each character and the degree of belief with respect to the recognition result.

The above objects of the present invention are also achieved by an apparatus for recognizing characters comprising: input means for inputting image data for a chain of characters; recognizing means for recognizing each character in the chain of characters based on the image data input by the input means, the recognition means including a plurality of processing means, each of the plurality of processing means generating a result based on independent information regarding each character, wherein a recognition result with respect to each character is determined based on the result generated in each of the plurality of processing means; degree of belief generating means for generating a degree of belief for the recognition result with respect to each character, the degree of belief generating means including: (1) certainty data generating means for generating certainty data based on the independent information which is used for generating the result in each of the plurality of processing means, the certainty data describing certainty with respect to the result obtained in each of the plurality of processing means, (2) combination means for combining the certainty data which are generated as results in the plurality of processing means by the step (1) with each other, and (3) generating means for generating the degree of belief for the recognition result with respect to each character based on a combination data obtained by the combination means; and output means for outputting the recognition result for each character and the degree of belief with respect to the recognition result.

Additional objects, features and advantages of the present invention will become apparent from the following detailed description when read in conjunction with the accompanying drawings.

DESCRIPTION OF THE PREFERRED EMBODIMENTS

This specification uses various terms which correspond to other terms which may commonly be used in the art. For example, the term "certainty factor", commonly used in the art, corresponds to the term "degree of belief" as used in this specification. The claims use the term "certainty factors", with the understanding that support for it lies in the degrees of belief described in the specification.

Similarly, for purposes of clarity, the phrase "certainty data items" is used in the claims at the end of this specification, although it is understood that the "certainty data" described in this "Description of the Preferred Embodiments" provide support for the claimed certainty data items.

A description will now be given of a first embodiment of the present invention with reference to the accompanying drawings.

Figure 1:
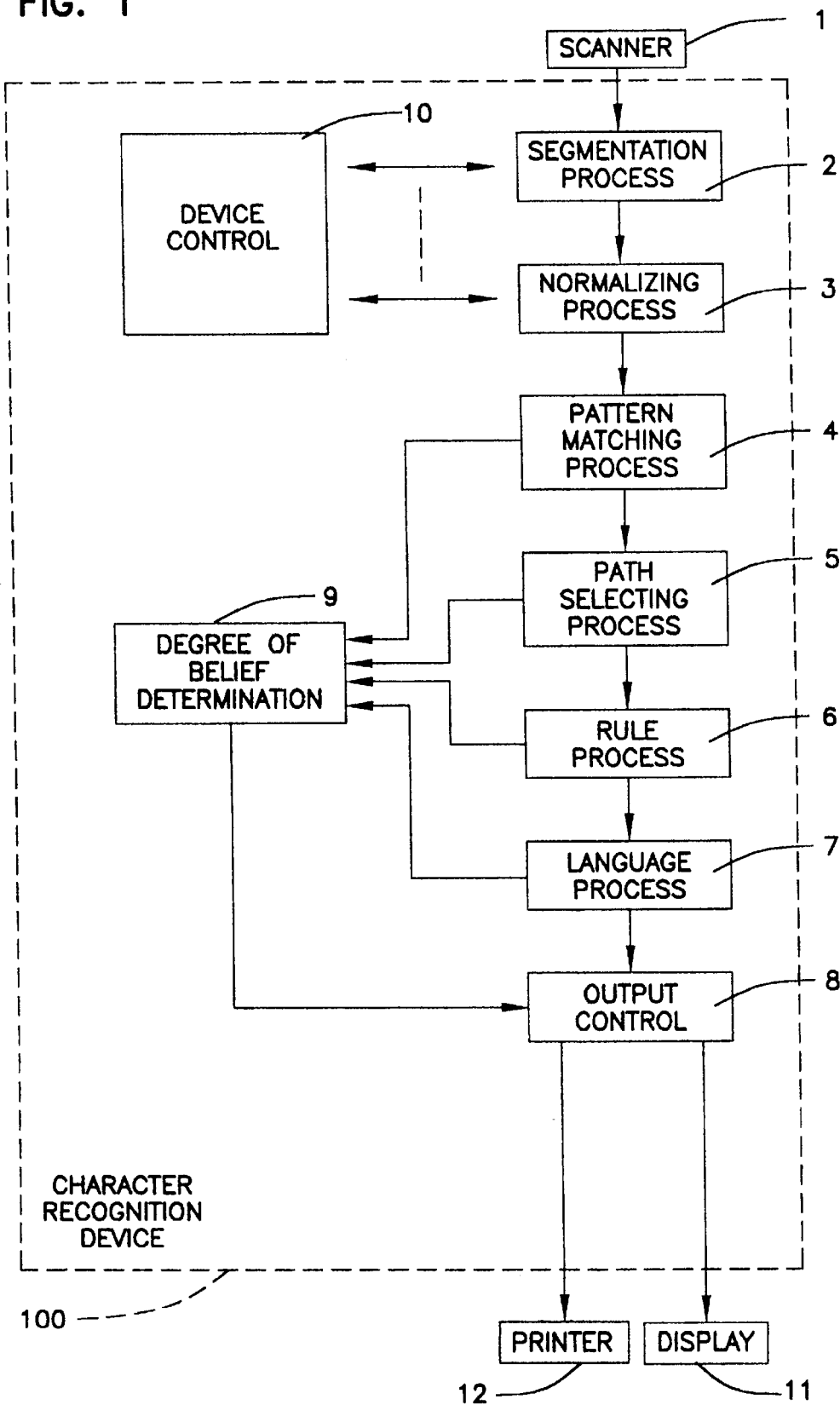
FIG. 1 is a block diagram illustrating a first embodiment of a character recognition system according to the present invention.

In FIG. 1, which illustrates a basic structure of a character recognition system, this system comprises a scanner 1, a character recognition device 100, a display unit 11, and a printing unit 12. The scanner 1 scans a document and outputs image data corresponding to an image formed on the document. The character recognition device 100 comprises a segmentation process part 2, a normalizing process part 3, a pattern matching process part 4, a path selecting process part 5, a rule process part 6, a language process part 7, and an output control part 8. The character recognition device 100 also comprises a degree of belief determining part 9 and a device control part 10. The segmentation process part 2 extracts an image for each character from characters which are obtained based on the image data supplied from the scanner 1. The normalizing process part 3 carries out a process for correcting distortion of the image for each character out of the chain of characters extracted by the segmentation process part 2. The pattern matching process part 4 abstracts a feature from each character normalized by the normalizing process part 3. The abstracted feature is compared with each reference pattern stored in a dictionary so that a degree of similarity or a degree of difference is calculated. Then the pattern matching process part 4 determines at least one candidate character as being the recognition result, the candidate character having the highest degree of similarity or the lowest degree of difference. The path selecting process part 5 carries out a process for selecting an optimum combination of images for the characters. In a case where the Japanese language is recognized, the path selecting process part 5 determines, for example, whether the character is formed of one full sized letter or of two half sized letters. The rule process part 6 carries out a process for revising each candidate character of the recognition results obtained by the pattern matching process based on one or a plurality of predetermined rules. The rules include a first rule with respect to information on the position of each character in the chain of characters, a second rule with respect to information on the size of each character, a third rule with respect to the type of each character, and the like. Due to the above first rule, a period "." and a dot "·" can be distinguished from each other, for example. The normalized character has a constant size. However, due to the above second rule, a capital letter "C" and a small letter "c", for example, can be distinguished from each other. Due to the above third rule, for example, in a case where there is a Japanese kanji character in a chain of Japanese katakana letters, the kanji letter is changed to a katakana letter which is a symbol representing a long sound. The language process part 7 carries out a morphological analysis with respect to the chain of characters which are revised by the rule process part 6, and further corrects errors in the chain of characters based on the result of the morphological analysis with reference to a word dictionary. The result obtained by the language process part 7 is used as a final recognition result in the character recognition device 100.

The pattern matching process part 4 also calculates an evaluation value with respect to each candidate character. The evaluation value is, for example, defined as a value in which a distance between the candidate character and the reference pattern in the dictionary is divided by the total number of outlines of the candidate character. A first candidate character has the highest evaluation value, and a second candidate character has the next highest evaluation value. Then the pattern matching process part 4 supplies the evaluation value for the first candidate character and the difference between the evaluation values for the first and second candidate characters to the degree of belief determining part 9.

The path selecting process means 5 supplies an evaluation value for the selected combination of images for characters to the degree of belief determining part 9. The rule process part 6 supplies information regarding the rule used for revising the candidate character to the degree of belief determining part 9. The language process part 7 supplies information representing a result of correcting errors.

The degree of belief determining part 9 carries out a process for calculating a degree of belief with respect to each recognition result which may not necessarily be certain. The degree of belief determining part 9 uses various items of information or qualitatively distant reconognition results supplied from distinct processes including the pattern matching process part 4, the path selecting process part 5, the rule process part 6 and the language process part 7 as evidence, and synthetically determines the degree of belief for each recognition result based on the Dempster-Shafer theory. The degree of belief for each recognition result is represented by one of three ranks A, B, and C, as will described later.

The output control part 8 controls the display unit 11 on which the final recognition result is displayed and the printer unit 12 which prints the final recognition result. The output control part 8 adds the information on the degree of belief to each corresponding recognition result. Thus, each recognition result is displayed and printed so that the degree of belief for a corresponding recognition result can be visually recognized.

The device control part 10 controls each part in the character recognition device 100 and the like.

A description will now be given of a structure of the process in the degree of belief determining part 9 with reference to FIG. 2.

The degree of belief determining part 9 uses the information obtained by the process in each part described above as evidence, and generates the degree of belief for each recognition result based on the Dempster-Shafer theory.

In the Dempster-Shafer theory, a degree of ignorance can be described, and synthetic information can be composed from fragmentary information (independent evidence). Further, an event is described by one of three types of probabilities. A first probability describes a degree of belief that the event is true ("belief"). A second probability describes a degree of ignorance as to whether or not the event is true ("ignorance"). A third probability describes a degree of doubt that the event is true ("doubt"). The above first probability is referred to as a lower probability. Thus, the lower probability describes a credibility that the event is true. The sum of the first and second probabilities is referred to as an upper probability ("belief"+"ignorance"). The upper probability describes a plausibility that the event is true.

TABLE 1

| LOWER PROBABILITY | | |
|---|---|---|
| BELIEF | IGNORANCE | DOUBT |
| UPPER PROBABILITY (PLAUSIBILITY) | | |

Figure 2:
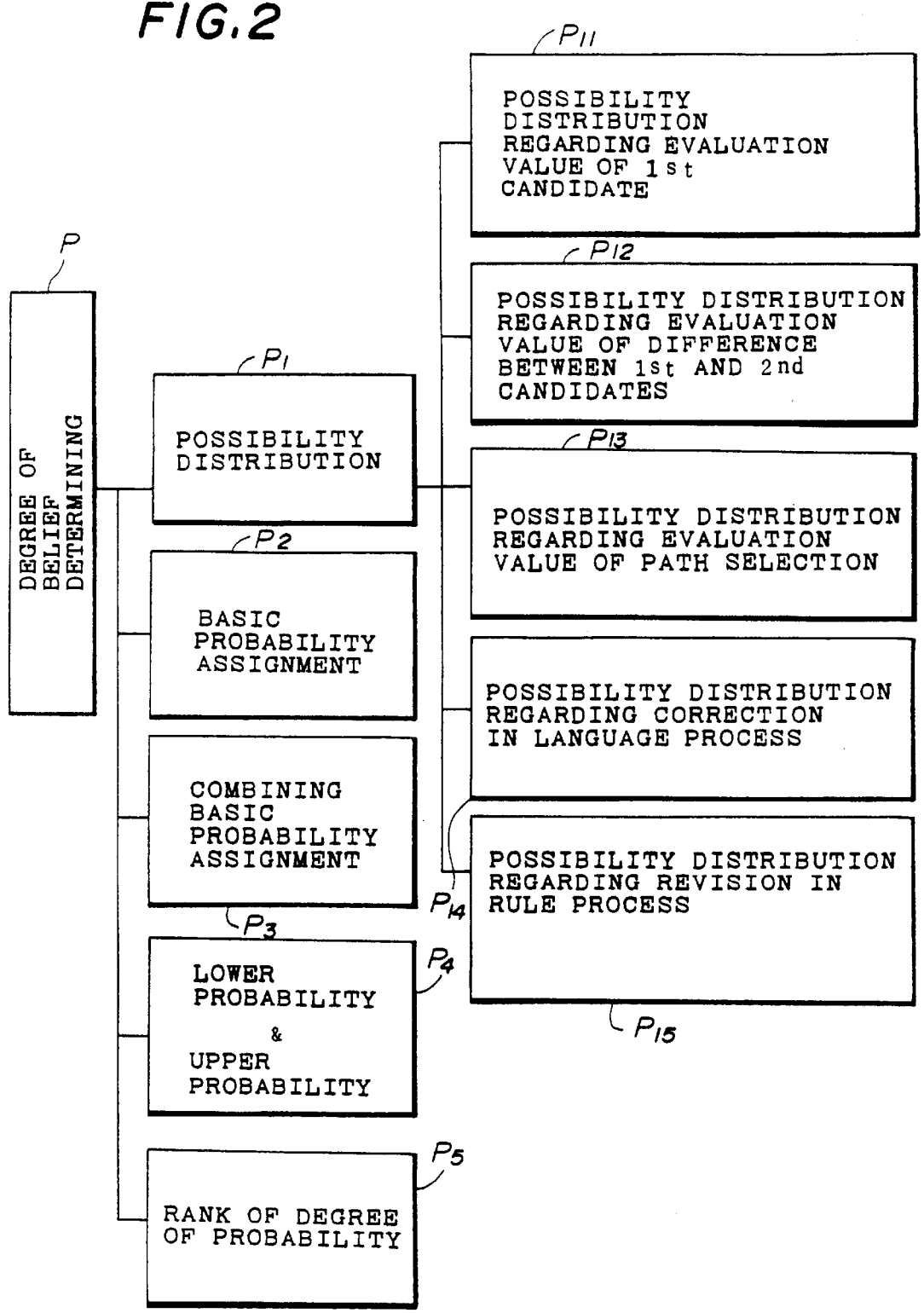
FIG. 2 is a block diagram illustrating steps included in a degree of belief determining process.

Referring to FIG. 2, the process P for determining the degree of belief comprises step $P_1$ for generating a possibility distribution, step $P_2$ for generating a basic probability assignment data, step $P_3$ for composing the basic probability data, step $P_4$ for calculating the lower possibility and the upper possibility, and step $P_5$ for determining a rank of the degree of belief for each recognition result.

A first hypothesis $H_1$ that the first candidate character (the recognition result) is correct, and a second hypothesis $H_2$ that the first candidate character is incorrect are formed in step $P_1$ for generating the possibility distribution, including the probabilities that respective hypotheses $H_1$ and $H_2$ are true, based on various items of evidence. Step $P_1$ comprises five sub-steps $P_{11}$ to $P_{15}$. Sub-step $P_{11}$ generates the possibility distribution in a case where the evaluation value for the first candidate character obtained by the pattern matching process part 4 is used as the evidence. Sub-step $P_{12}$ generates the possibility distribution in a case where the difference between the evaluation values for the first and second candidate characters obtained by the pattern matching process part 4 is used as the evidence. Sub-step $P_{13}$ generates the possibility distribution in a case where the evaluation value with respect to the selected combination of the images for characters is used as the evidence. Sub-step $P_{14}$ generates the possibility distribution based on the revision carried out in the rule process part 6. The sub-step $P_{15}$ generates the possibility distribution based on the information on the correction carried out in the language process part 7.

In sub-step $P_{11}$, the probability y that the first hypothesis $H_1$ is true is calculated in accordance with a equation $y=-x/3+100$, where x is the evaluation value for the first candidate character. In this case, the evaluation value corresponds to the degree of difference between the candidate character and the input character, so that when the evaluation value increases, the degree of difference between the candidate character and the input character increases. The maximum evaluation value is "255" and the minimum evaluation value is "0". For example, when the evaluation value for the first candidate character is "118", the following possibility distribution is obtained in sub-step $P_{11}$.

TABLE 2

|  | $H_1$ IS TRUE | $H_2$ IS TRUE |
|---|---|---|
| PROBABILITY | 61% | 39% |

In sub-step $P_{12}$, the probability y that the first hypothesis $H_1$ is true is calculated in accordance with an equation $y=5x/2$, where x denotes the difference between the evaluation values for the first and second candidate characters. For example, when the second candidate character is not abstracted by the pattern matching process part 4, the following possibility distribution is obtained in sub-step $P_{12}$.

TABLE 3

|  | $H_1$ IS TRUE | $H_2$ IS TRUE |
|---|---|---|
| PROBABILITY | 95% | 5% |

In sub-step $P_{13}$, the probability y that the first hypothesis $H_1$ is true is calculated in accordance with an equation $y=2x/5$, where x denotes the evaluation value for the combination of the images for the characters which are selected by the path selecting process part 5. For example, when the evaluation value for the combination of the images for the characters is "24", the following possibility distribution is obtained in sub-step $P_{13}$.

TABLE 4

|  | $H_1$ IS TRUE | $H_2$ IS TRUE |
|---|---|---|
| PROBABILITY | 9% | 91% |

In sub-step $P_{14}$, a probability that the first hypothesis $H_1$ is true and a probability that the second hypothesis $H_2$ is true are respectively generated. These probabilities are heuristically determined on the basis of the rule used in the rule process part 6. For example, the following possibility distribution is obtained in sub-step $P_{14}$.

TABLE 5

|  | $H_1$ IS TRUE | $H_2$ IS TRUE |
|---|---|---|
| PROBABILITY | 90% | 30% |

In sub-step $P_{15}$, a probability that the first hypothesis $H_1$ is true and a probability that the second hypothesis $H_2$ is true are respectively generated. These probabilities are heuristically determined on the basis of the information on the error correction carried out by the language process part 7. For example, the following possibility distribution is obtained in sub-step $P_{15}$.

TABLE 6

|  | $H_1$ IS TRUE | $H_2$ IS TRUE |
|---|---|---|
| PROBABILITY | 90% | 30% |

After the possibility distribution is obtained by step $P_1$, including sub-steps $P_{11}$, $P_{12}$, $P_{13}$, $P_{14}$ and $P_{15}$, step $P_2$ converts the above possibility distribution into the basic probability assignment. That is, a probability $m(H_1)$ that the first hypothesis $H_1$ is true, a probability $m(H_1\,H_2)$ which describes a degree of ignorance as to whether or not the first hypothesis $H_1$ is true, and a probability $m(H_2)$ that the first hypothesis $H_1$ is not true are obtained. In a case where the possibility distribution is generated as indicated in Table-2, the possibility distribution is converted into the following basic probability assignment.

TABLE 7

| $m(H_1)$ | $m(H_1\,H_2)$ | $m(H_2)$ |
|---|---|---|
| 22% | 78% | 0% |

In this case, the 39% probability that the second hypothesis $H_2$ is true is subtracted from the 61% probability that the first hypothesis $H_1$ is true, so that $m(H_1)$ of 22% is obtained. Then, the $m(H_1)$ of 22% is subtracted from 100%, so that $m(H_1\,H_2)$ of 78% and $m(H_2)$ of 0% are obtained.

In a case where the possibility distribution is generated as indicated in Table-3, the possibility distribution is converted into the following basic probability assignment.

TABLE 8

| $m(H_1)$ | $m(H_1\,H_2)$ | $m(H_2)$ |
|---|---|---|
| 90% | 10% | 0% |

In a case where the possibility distribution is generated as indicated in Table-4, the following basic probability assignment is obtained.

TABLE 9

| $m(H_1)$ | $m(H_1\,H_2)$ | $m(H_2)$ |
|---|---|---|
| 0% | 18% | 82% |

In this case, the 9% probability that the first hypothesis $H_1$ is true is subtracted from the 91% probability that the second hypothesis $H_2$ is true, so that $m(H_2)$ of 82% is obtained. Then the $m(H_2)$ is subtracted from 100%, so that $m(H_1\,H_2)$ of 18% and $m(H_1)$ of 0% are obtained.

In cases where the possibility distributions are generated as indicated in Table-5 and Table-6, each possibility distribution is converted into the following basic probability assignment.

TABLE 10

| $m(H_1)$ | $m(H_1\,H_2)$ | $m(H_2)$ |
|---|---|---|
| 60% | 40% | 0% |

Next, step $P_3$ combines the basic probabilities obtained by the above step $P_2$, which are indicated in Tables 7 through 10, based on Dempster's rule of combination. In general, Dempster's rule of combination is used in a case where the basic probabilities which are inferred based on independent evidence are combined. The combination basic probability $m(H)$ is calculated in accordance with the following formula.

$$m(H) = \left[\sum_{H_1 \cap H_2 = H} m(H_1) \times m(H_2)\right] \Big/ \left[1 - \sum_{H_1 \cap H_2 = \phi} m(H_1) \times m(H_2)\right] \quad (1)$$

where, $m(H_1)$ and $m(H_2)$ are respectively basic probabilities and H is either $H_1$, $H_2$, or $H_1\,H_2$. $H_1\,H_2$ is a hypothesis that either $H_1$ or $H_2$ is true and thus $H_1\,H_2$ is certainly true.

After the basic probabilities obtained by step $P_2$, as indicated in Tables-7, 8, 9 and 10, the basic probabilities are combined with each other in accordance with the above formula so that the following combination basic probability assignment is obtained.

TABLE 11

| $m(H_1)$ | $m(H_1\,H_2)$ | $m(H_2)$ |
|---|---|---|
| 93% | 1% | 6% |

After that, step $P_4$ calculates the upper probability and the lower probability. In a case where the basic probability assignment indicated in Table-11 is obtained, the upper probability and lower probability for a hypothesis "the first candidate character is correct" ($H_1$) are calculated as follows.

TABLE 12

| LOWER PROBABILITY | UPPER PROBABILITY |
|---|---|
| 93% | 94% |

Further, the upper probability and the lower probability for a hypothesis "the first candidate character is incorrect" ($H_2$) are also calculated as follows.

TABLE 13

| LOWER PROBABILITY | UPPER PROBABILITY |
|---|---|
| 6% | 7% |

Finally, a rank of the degree of belief that the first candidate character is true is determined based on the lower probability and the upper probability, in step $P_5$. For example, either a rank A, B or C is determined in accordance with the following rules.

a) When the upper probability for the hypothesis $H_2$ is within a range between 0 to 19, the first candidate character is true so that the degree of belief is a "rank A".

b) When the upper probability for the hypothesis $H_2$ is within a range between 20 to 79, the first candidate character is doubtful so that the degree of belief is a "rank B".

c) When the upper probability for the hypothesis $H_2$ is within a range between 80 to 100, the first candidate character is not true so that the degree of belief is a "rank C".

According to the above rules, the degree of belief for the hypothesis having the upper probability and the lower probability indicated in Tables 12 and 13 is determined to be the "rank A".

After the rank of the degree of belief for each recognized character in the chain of characters are determined as described above, the recognition result for each character is displayed on the display unit 11 and/or printed by the printer unit 12 so that the character having a low degree of belief can be visually recognized by a user.

Figures 3A, 3B:
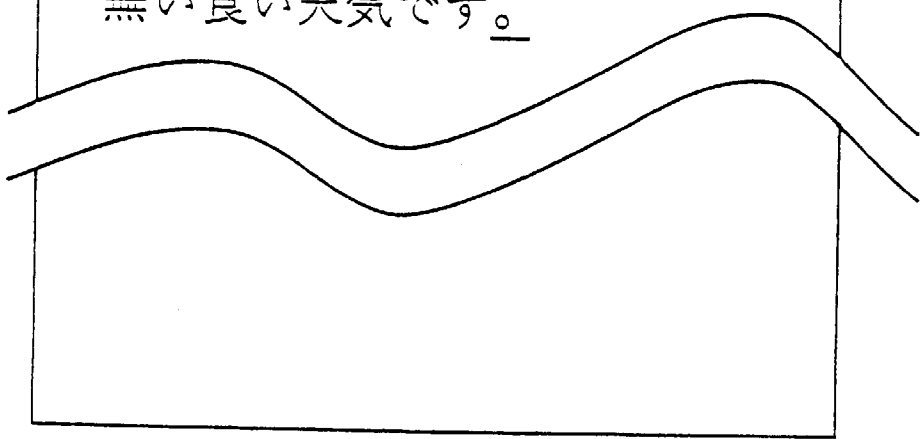
FIGS. 3A, 3B, 4A and 4B are diagrams showing examples of outputting recognition results and a degree of belief for each recognition result.

In a case where Japanese characters are recognized, the recognized Japanese characters are, for example, displayed on the display unit 11 as shown in FIG. 3A. In FIG. 3A, dark marks are displayed on the display unit so as to overlap each character which has the rank B or C of the degree of belief, so that the user can determine whether or not each character has the low degree of belief.

Each character having the low degree of belief can also be underlined, as shown in FIG. 3B. In FIG. 3B, the recognized characters are printed by the printer unit 12 so that each character having the rank B or C of the degree of belief is underlined.

Figure 4A:
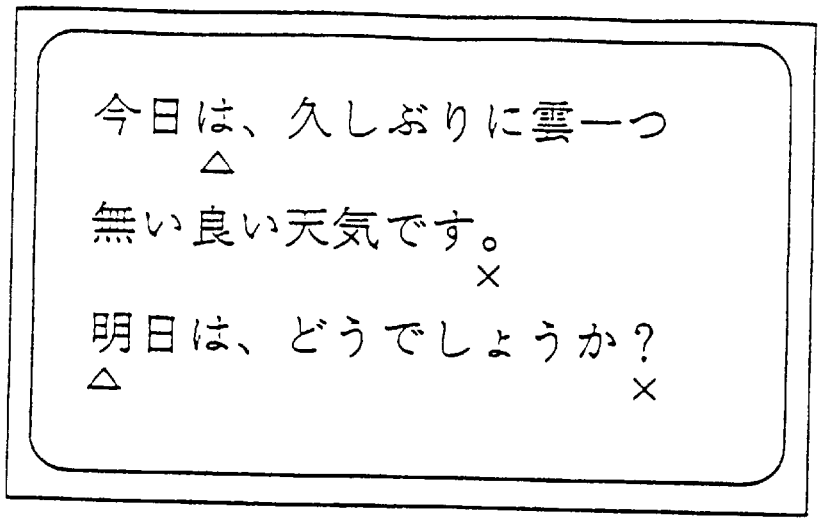
Figure 4B:
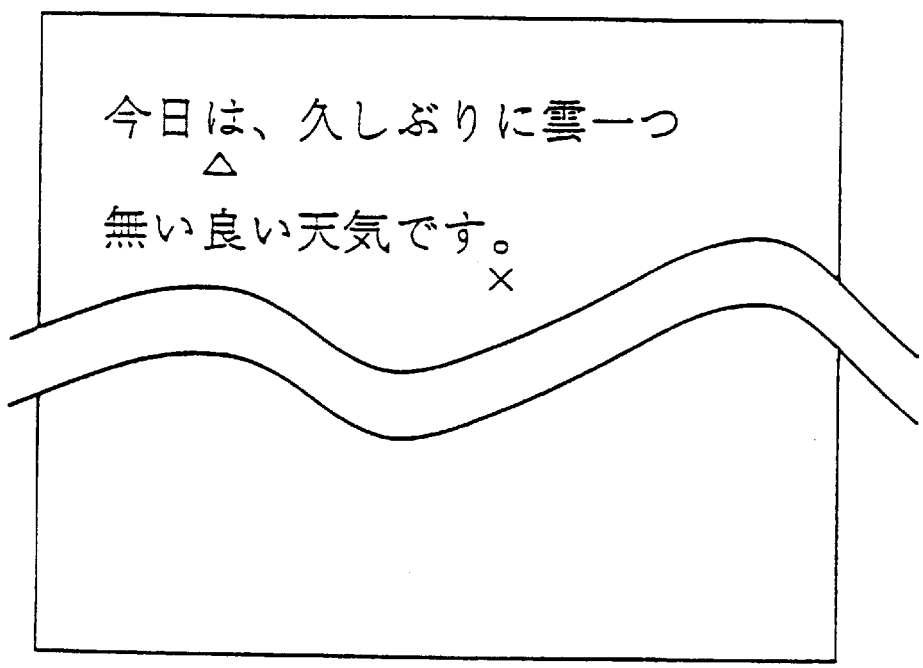

A predetermined mark can also be added to each character having the low degree of belief, as shown in FIGS. 4A and 4B. In FIG. 4A, the recognized characters are displayed on the display unit 11 so that a triangle markΔ is added to each character having the degree of belief of the rank B and a cross mark x is added to each character having the degree of belief of the rank C. In FIG. 4B, the recognized characters are printed by the printer unit 12 in the same manner as those shown in FIG. 4A.

The recognized characters can be displayed and/or printed in accordance with a rule in which the characters having the degree of belief of the rank A are black, and the characters having the degree of belief of the rank B and C are white under a condition where the background thereof is black. The brightness of each character displayed on the display unit 11 can be varied in accordance with the degree of belief, and the color of each character can also be changed in accordance with the degree of belief. For example, the characters having the degree of belief of the rank A are white, the characters having the degree of belief of the rank B are yellow (a caution), and the characters having the degree of belief of the rank C are red (a warning), under a condition where the background of the characters is black.

The recognized characters can also be displayed and/or printed in accordance with a rule in which the characters having the degree of belief of the rank A are black, the characters having the degree of belief of the rank B are underlined, and the characters having the degree of belief of the rank C are double underlined, under a condition where the background of the characters is white. Further, the style of the characters can be changed in accordance with the degree of belief for each character. For example, the characters having the degree of belief of the rank A are represented by Courier type, the characters having the degree of belief of the rank B are represented by Gothic type, and the characters having the degree of belief of the rank C are represented by Italic type. Still further, a letter "B" can be displayed adjacent to the characters having the degree of belief of the rank B, and a letter "C" can be displayed adjacent to the characters having the degree of belief of the rank C.

A description will now be given of a second embodiment of the invention.

Figure 5:
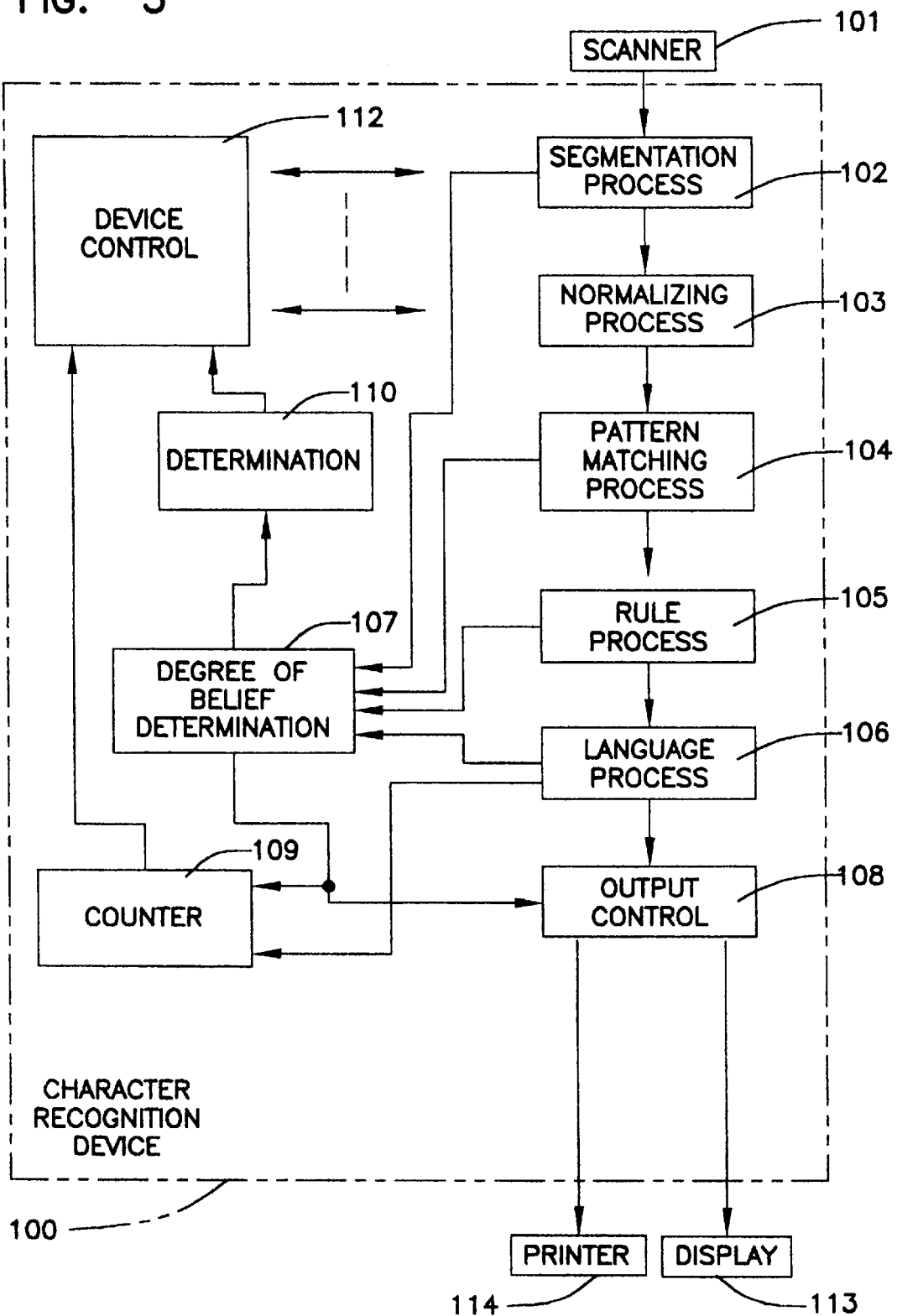
FIG. 5 is a block diagram illustrating a second embodiment of a character recognition system according to the present invention.

FIG. 5 shows a basic structure of a recognition system according to the second embodiment of the present invention. Referring to FIG. 5, the recognition system comprises a scanner 101, a character recognition device 100, a display unit 113 and a printer unit 114. The character recognition device 100 comprises a segmentation process part 102, a normalizing process part 103, a pattern matching process part 104, a rule process part 105, a language process part 106, a degree of belief determining part 107, an output control part 108 and a device control part 112, in the same manner as that shown in FIG. 1. The character recognition system further comprises a counting part 109 and a determining part 110.

The degree of belief determining part 107 basically determines a degree of belief for each candidate character in accordance with the Dempster-Shafer theory. The evaluation value for the first candidate character and the difference between the evaluation values for the first and second candidate characters from the pattern matching process part 104, the information on a rule used in the rule process part 105, and the information on the error correction carried out by the language process part 106 are supplied to the degree of belief determining part 107. Further, information regarding a pitch between images for characters and the width of the square area used for getting the image for the character out of a chain of characters are also supplied from the segmentation process part 102 to the degree of belief determining part 107. The degree of belief determining part 107 determines the degree of belief for each candidate character in each process part based on the information (the evidence) supplied from each corresponding process part. Then the degree of belief determined in a preceding process is updated based on the degree of belief for each candidate character in each process part. The degree of belief is repeatedly updated until the final process is completed. Thus, when the degree of belief is updated based on the degree of belief corresponding to the language process part 106 (the final process part), the final degree of belief is obtained.

The counter part 109 counts the number of candidate characters, which have a degree of belief less than or equal to a predetermined level, such as characters having the degree of belief of the rank B and/or the rank C. Then, when the counter value of the counter part 109 becomes greater than or equal to a predetermined threshold value, the counter part 109 outputs a count over signal.

The determining part 110 compares the degree of belief which is obtained for each candidate character based on the information from the segmentation process part 102 with a predetermined threshold value. When the degree of belief is less than the threshold value, the determining part 110 outputs a delete signal. The delete signal is used for deleting the candidate character having the degree of belief less than the threshold value from the candidate characters.

The device control part 112 controls various process parts in the character recognition device 100. When the counter part 109 outputs the count over signal, the process in each process part is discontinued and a buzzer is driven to supply a warning to the user, based on instructions from the device control part 112. In addition, when the determining part 110 outputs the delete signal, the candidate character corresponding to the delete signal is deleted from the candidate characters based on an instruction from the device control part 112.

Figure 7:
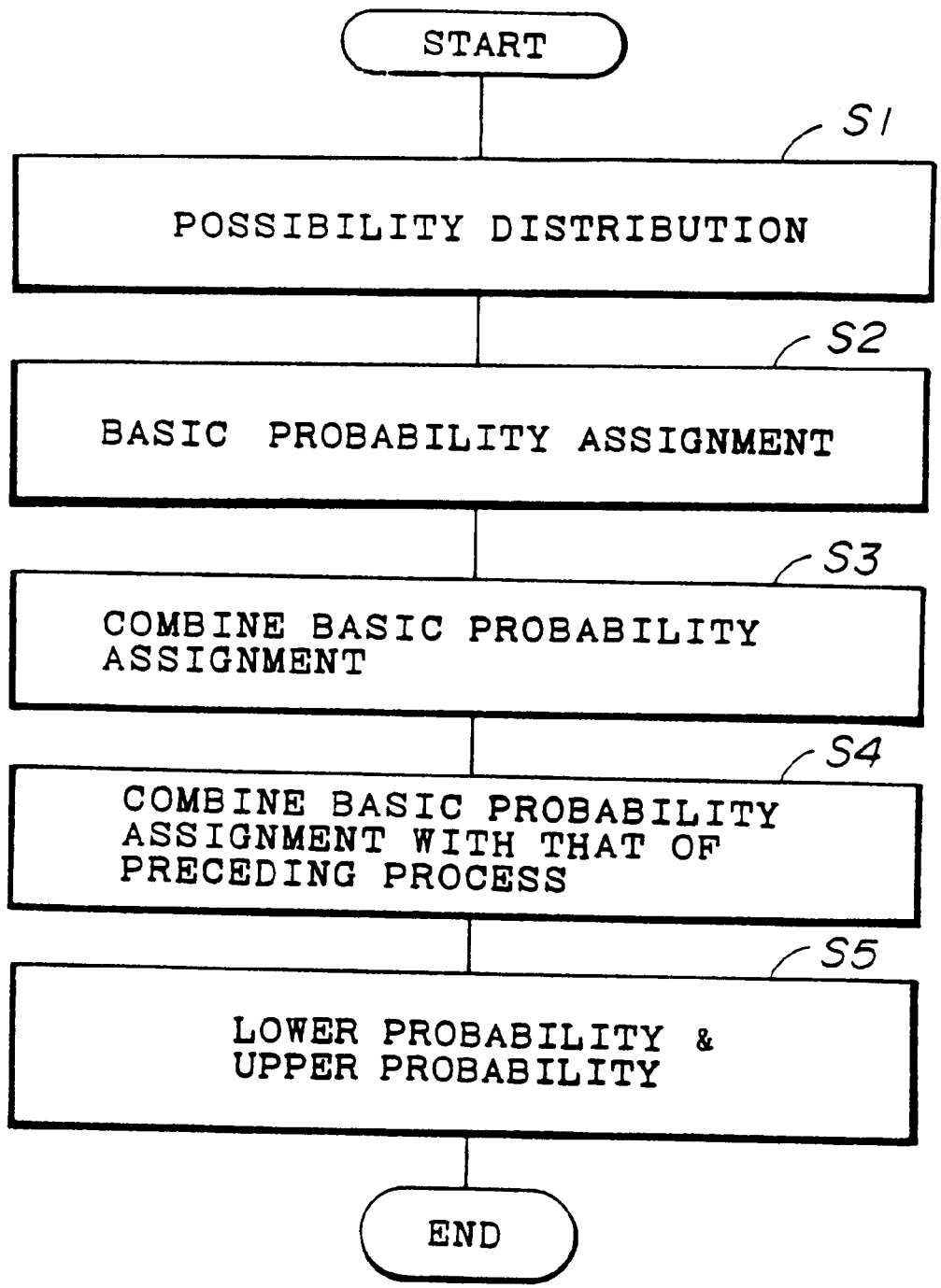
FIG. 7 is a flow chart illustrating a process carried out in a degree of belief determining part shown in FIG. 5.

The degree of belief determining part 107 carries out a process shown in FIG. 7 whenever each process part completely carries out the process.

First, the hypotheses $H_1$, $H_2$, . . . , $H_n$ are defined. Referring to FIG. 7, step $S_1$ generates a possibility distribution based on each item of evidence supplied from each process part. The possibility distribution includes a probability that each hypothesis $H_i$ (i=1,2, . . . ,n) is true. When the evidence has a numerical value, the probability for each hypothesis $H_i$ is calculated in accordance with an equation, such as $$y = -3/x + 100$$

where y denotes the probability and x is the evidence (numerical value). When the evidence does not have a numerical value, the probability with respect to the evidence is heuristically determined based on each item of evidence. Next, step $S_2$ converts the probability into the basic probability assignment in accordance with the Dempster-Shafer theory, as has been described above. That is, a basic probability that each hypothesis $H_i$ is true, a basic probability that each hypothesis $H_i$ is ignore, and a basic probability that each hypothesis is not true are generated. The basic probability corresponds to a degree of belief for each candidate character. The lower probability and the upper probability are calculated based on the basic probability assignment, and then the degree of belief can be calculated based on the lower probability and the upper probability.

When a plurality of items of evidence are supplied from the process part, basic probabilities for respective items of evidence are combined with each other in accordance with Dempster's rule of combination, in step $S_3$.

Step $S_4$ combines the basic probability for each hypothesis $H_i$ with the basic probability for each corresponding hypothesis which has been obtained at the preceding process part so that an updated basic probability is obtained. Then, step $S_5$ calculates the lower probability and the upper probability based on the updated basic probability.

The basic probability is updated whenever each process part completely carries out the process, thus, the updated basic probability which is obtained when the language process part 106 completely carries out the process is used as a final basic probability.

A detailed description will now be given of an example of a process for determining the degree of belief in the second embodiment.

Figure 6A:
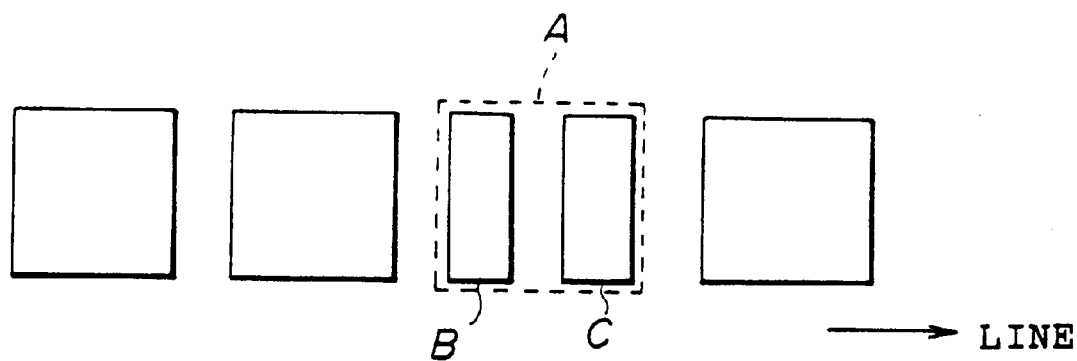
FIGS. 6A and 6B are diagrams showing areas used for getting images for characters out of a chain of characters.
Figure 6B:
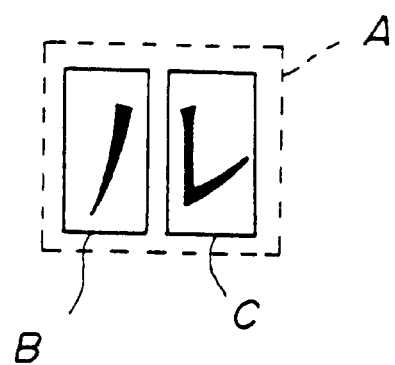

The segmentation process part 102 gets, for example, three candidate images out of a part of a chain of characters, as shown in FIG. 6A, each candidate image corresponding to one character. That is, a first candidate image in a first square area A, a second candidate image in a second square area B, and a third candidate image in a third square area C are respectively obtained. For example, in a case of an image corresponding to a Japanese katakana letter "ル" (Ru), a candidate image "ル" in the first square area A, a candidate image "/" in the second square area B, and a candidate image "ㇾ" in the third square area C are respectively extracted from an image "ル", as shown in FIG. 6B. The degree of belief determining part 107 determines the degree of belief for each candidate image based on a pitch between images, the width of each square area and the like (the evidence), in accordance with the process shown in FIG. 7. As a result, the degree of belief represented by the lower probability and the upper probability for each candidate image are obtained as follows.

TABLE 14

|  | LOWER PROBABILITY | UPPER PROBABILITY |
| --- | --- | --- |
| SQUARE A | $P_{aL}\%$ | $P_{aU}\%$ |
| SQUARE B | $P_{bL}\%$ | $P_{bU}\%$ |
| SQUARE C | $P_{cL}\%$ | $P_{cU}\%$ |

For example, if either the lower probability or the upper probability for a candidate image is less than a predetermined value, the determining part 110 outputs the delete signal for a corresponding candidate image so that the corresponding candidate image is deleted from the candidate images.

The pattern matching process part 104 carries out the pattern matching process for each candidate image obtained by the segmentation process part 102 and then generates candidate characters for each candidate image. For example, in the case of the Japanese katakana letter "ル", candidate character "ル" for the first candidate image "ル" in the first square area A, candidate characters "/", "メ" and "/" for the second candidate image "/" in the second square area B, and candidate characters "ㇾ" and "ㇾ" for the third candidate image "ㇾ" in the third square area C are respectively obtained. The degree of belief determining part 107 determines the degree of belief for each candidate character based on the evaluation value for the first candidate character, the difference between the evaluation values of the first and second candidate characters and the like (the evidence) in accordance with the process as shown in FIG. 7. Thus, the degree of belief for each candidate character is obtained as follows.

TABLE 15

|  |  | L-PROBABILITY | U-PROBABILITY |
| --- | --- | --- | --- |
| SQUARE A | 1st CANDIDATE | $P_{aL1}\%$ | $P_{aU1}\%$ |
|  | 2nd CANDIDATE | $P_{aL2}\%$ | $P_{aU2}\%$ |
|  | 3rd CANDIDATE | $P_{aL3}\%$ | $P_{aU3}\%$ |
| SQUARE B | 1st CANDIDATE | $P_{bL1}\%$ | $P_{bU1}\%$ |
|  | 2nd CANDIDATE | $P_{bL2}\%$ | $P_{bU2}\%$ |
|  | 3rd CANDIDATE | $P_{bL3}\%$ | $P_{bU3}\%$ |
| SQUARE C | 1st CANDIDATE | $P_{cL1}\%$ | $P_{cU1}\%$ |
|  | 2nd CANDIDATE | $P_{cL2}\%$ | $P_{cU2}\%$ |
|  | 3rd CANDIDATE | $P_{cL3}\%$ | $P_{cU3}\%$ |

L-PROBABILITY: the lower probability
U-PROBABILITY: the upper probability

Then the degree of belief obtained for each candidate image supplied from the segmentation process part 102, as shown in Table-14, and the degree of belief obtained for each candidate character supplied from the pattern matching process part 104, as shown in Table-15, are combined by the degree of belief determining part 107 so that the updated degree of belief is obtained.

When the degree of belief for the candidate character in each candidate image is less than a predetermined value, the candidate character can be deleted from each corresponding candidate image. As a result, it is possible to decrease processing time.

In addition, in this step, it is also possible to determine whether the candidate image either in the first square A, in the second square B, or in the third square C is true, based on the updated degree of belief. For example, if it is assumed that the candidate image in the first square A is true, the candidate characters corresponding to the first square A are selected by the following process part.

After that, the degree of belief determining part 107 determines the degree of belief for each candidate character based on information regarding the position of the character, the character size, the type of character and so on. Then, the degree of belief determining part 107 combines the degree of belief obtained based on the information supplied from the rule process part 105 with the degree of belief updated based on the information supplied from the pattern matching process part 104 so that the following updated degree of belief for each candidate character shown in Table-16 is obtained.

TABLE 16

|  | LOWER PROBABILITY | UPPER PROBABILITY |
|---|---|---|
| 1st CANDIDATE | $P_{1L}$ % | $P_{1U}$ % |
| 2nd CANDIDATE | $P_{2L}$ % | $P_{2U}$ % |
| 3rd CANDIDATE | $P_{3L}$ % | $P_{3U}$ % |

For example, when the information that the character is positioned near the center of the chain of the characters in a direction perpendicular to the arrangement direction of the characters is supplied to the degree of belief determining part 107, the degree of belief for a character "·" increases, and the degree of belief for characters "." and "'" decreases.

The language process part 106 corrects the candidate character with reference to the word dictionary. The degree of belief determining part 107 determines the degree of belief based on the information used in the language process part 106. Then the degree of belief determining part 107 combines the degree of belief obtained based on the information supplied from the language process part 106 with the degree of belief updated based on the information supplied from the rule process part 105 so that the following updated degree of belief for each candidate character is obtained.

TABLE 17

|  | LOWER PROBABILITY | UPPER PROBABILITY |
|---|---|---|
| 1st CANDIDATE | 15% | 80% |
| 2nd CANDIDATE | 10% | 33% |
| 3rd CANDIDATE | 12% | 33% |

The degree of belief updated based on the information supplied from the language process part 106, which is a final process part, is a final degree of belief. For example, the first candidate character having the maximum value of the lower probability is output, as the recognition result, from the character recognition device 100. In addition, the degree of belief for the first candidate character is converted into a rank of the degree of belief based on threshold values as has been described above, and then the rank of the degree of belief for the first candidate character is also output from the character recognition device 100.

A further detailed description will now be given of an example of a process for determining the degree of belief in the second embodiment.

Figure 8:
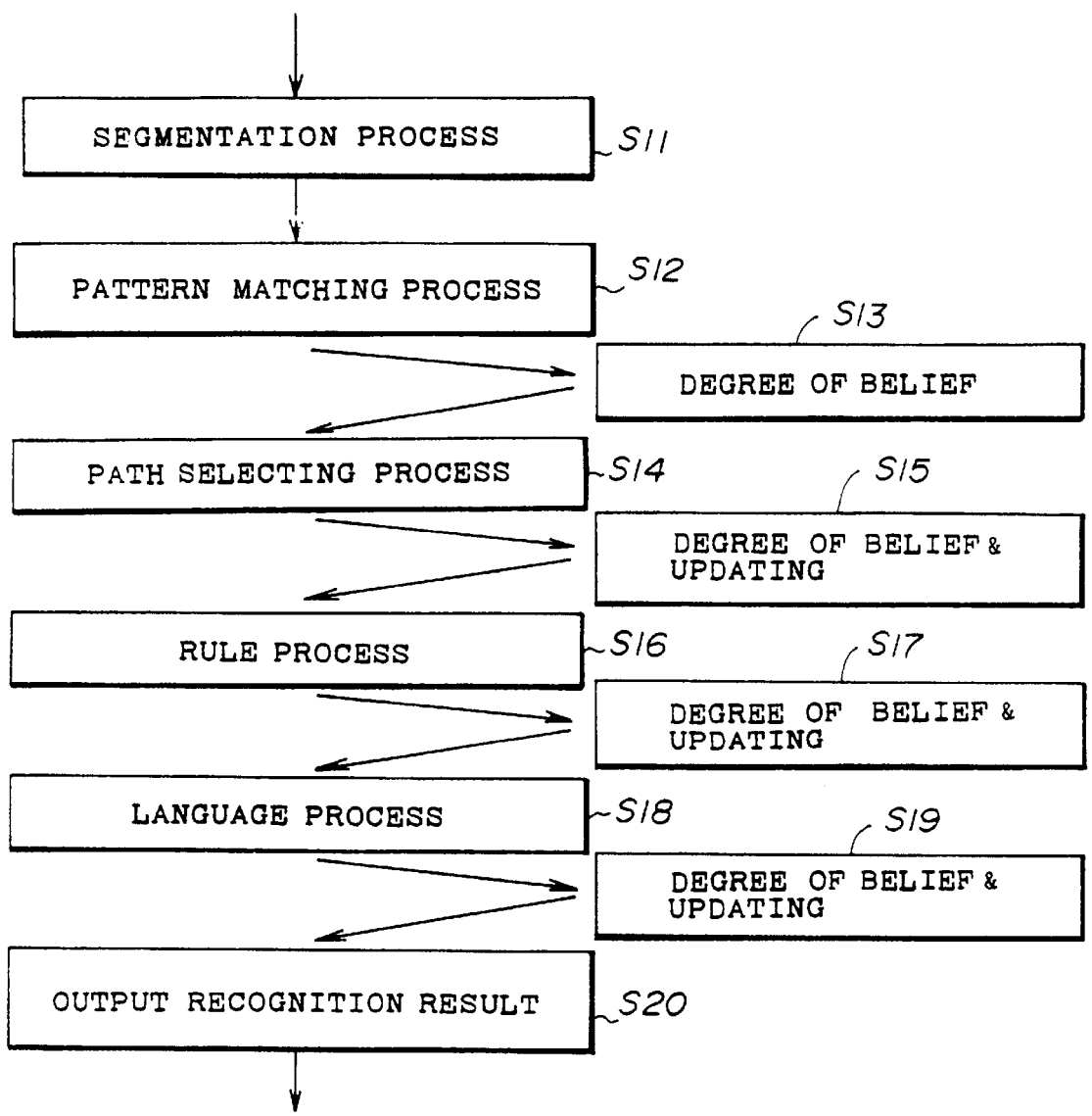
FIG. 8 is a flow chart illustrating another process carried out in the degree of belief determining part.

The character recognition system is, for example, constituted as shown in FIG. 1, and processes are carried out in accordance with a flow chart shown in FIG. 8.

Referring to FIG. 8, step $S_{11}$ gets candidate images out of a part of a chain of characters. Then step $S_{12}$ carries out a pattern matching process with respect to each candidate image obtained by step $S_{11}$ so that candidate characters are obtained. Step $S_{12}$ generates, for example, three candidate characters. Step $S_{13}$ determines a degree of belief for each candidate character in accordance with the Dempster-Shafer theory. That is, step $S_{13}$ carries out the following process.

First, the following three hypotheses $H_1$, $H_2$ and $H_3$ for three candidate characters are formed.

$H_1$: the first candidate character is correct.
$H_2$: the second candidate character is correct.
$H_3$: the third candidate character is correct.

An evaluation value for each candidate character is determined. For example, the evaluation value for each candidate character is obtained as shown in Table-18.

TABLE 18

| CANDIDATE CHARACTER | 1st | 2nd | 3rd |
|---|---|---|---|
| EVALUATION VALUE | 118 | 140 | 200 |

These evaluation values are used as evidence $A_1$. Then, a probability y for each hypothesis is calculated in accordance with, for example, the above described equation $y=-3/x+100$, so that the following possibility distribution for the evidence $A_1$ is obtained.

TABLE 19

|  | $H_1$ IS TRUE | $H_2$ IS TRUE | $H_3$ IS TRUE |
|---|---|---|---|
| PROB. ($A_1$) | 61% | 53% | 33% |

In addition, another possibility distribution is calculated based on evidence $B_1$ corresponding to information obtained by a pattern matching process in step $S_{12}$, as shown in Table-20.

TABLE 20

|  | $H_1$ IS TRUE | $H_2$ IS TRUE | $H_3$ IS TRUE |
|---|---|---|---|
| PROB. ($B_1$) | 55% | 40% | 21% |

After this, the possibility distribution for each item of evidence, as indicated in Tables 19 and 20, is converted into the following basic probability assignment.

TABLE 21

|  | m ($H_1$) | m ($H_1$ $H_2$) | m ($H_1$ $H_2$ $H_3$) |
|---|---|---|---|
| EVIDENCE $A_1$ | 8% | 20% | 72% |
| EVIDENCE $B_1$ | 15% | 19% | 64% |

In Table-21, m($H_1$) represents a probability that the hypothesis $H_1$ is true, m($H_1$ $H_2$) represents a probability that either hypothesis $H_1$ or $H_2$ is true, and m($H_1$ $H_2$ $H_3$) represents a probability that any one of hypotheses $H_1$, $H_2$ or $H_3$ is true. After the basic probability assignment is obtained, as shown in Table-21, the basic probability assignment for item of the evidence $A_1$ and that for the item of evidence $B_1$ are combined with each other in accordance with Dempster's rule of combination so that the following combination basic probability assignment is obtained.

TABLE 22

| m ($H_1$) | m ($H_1$ $H_2$) | m ($H_1$ $H_2$ $H_3$) |
|---|---|---|
| 22% | 32% | 46% |

| m ($H_2$) | m ($H_3$) | m ($H_2$ $H_3$) | m ($H_1$ $H_3$) |
|---|---|---|---|
| 0% | 0% | 0% | 0% |

The combination basic probability assignment, indicated in Table-22, which is obtained in step $S_{13}$ is stored in a memory (not shown).

After the combination basic probability assignment is stored in the memory, step $S_{14}$ carries out a process for selecting an optimum combination of images for characters. Then, step $S_{15}$ calculates basic probability assignment for both items of evidence $A_2$ and $B_2$ obtained in step $S_{14}$. For example, the following basic probability assignment for each item of evidence is obtained in step $S_{15}$.

TABLE 23

| | m ($H_1$) | m ($H_1$ $H_2$) | m ($H_1$ $H_2$ $H_3$) |
|---|---|---|---|
| EVIDENCE $A_1$ | 21% | 43% | 36% |
| EVIDENCE $B_2$ | 9% | 62% | 29% |

The basic probability assignment for items of evidence $A_2$ and $B_2$ are combined in accordance with Dempster's rule of combination. As a result, the following combination basic probability assignment is obtained.

TABLE 24

| m ($H_1$) | m ($H_1$ $H_2$) | m ($H_1$ $H_2$ $H_3$) |
|---|---|---|
| 28% | 62% | 10% |

| m ($H_2$) | m ($H_3$) | m ($H_2$ $H_3$) | m ($H_1$ $H_3$) |
|---|---|---|---|
| 0% | 0% | 0% | 0% |

Further, the basic probability assignment indicated in Table-24 and the basic probability assignment which is obtained in the processing step and stored in the memory are combined with each other in accordance with Dempster's rule of combination. As a result, the following updated basic probability assignment is obtained.

TABLE 25

| m ($H_1$) | m ($H_1$ $H_2$) | m ($H_1$ $H_2$ $H_3$) |
|---|---|---|
| 43% | 52% | 5% |

| m ($H_2$) | m ($H_3$) | m ($H_2$ $H_3$) | m ($H_1$ $H_3$) |
|---|---|---|---|
| 0% | 0% | 0% | 0% |

In this case, the basic probabilities for both $H_2$ and $H_3$ are 0%. In addition, a total of basic probabilities for hypotheses including $H_2$ is 57% [m($H_1$ $H_2$)+m($H_1$ $H_2$ $H_3$)=57%], but, a total of basic probabilities for hypotheses including $H_3$ is 5% [m($H_1$ $H_2$ $H_3$)=5%]. Thus, the second candidate character can not be deleted from the candidate characters, but the third candidate character can be deleted from the candidate characters so that the process time can be decreased in later steps. That is, only the first candidate character and the second candidate character are processed, and the basic probabilities for m($H_3$), m($H_1$ $H_3$) and m($H_1$ $H_2$ $H_3$) are not calculated in later steps. Then, the basic probability assignment which is updated with respect to the first and second candidate characters in step $S_{15}$ is stored in the memory.

Next, step $S_{16}$ carries out a process for revising each candidate character in accordance with predetermined rules. Then, step $S_{17}$ carries out a process for calculating the basic probability assignment for items of evidence $A_3$ and $B_3$ obtained in the step $S_{16}$. In step $S_{17}$, the following basic probability assignment is obtained.

TABLE 26

| | m ($H_1$) | m ($H_1$ $H_2$) | m ($H_2$) |
|---|---|---|---|
| EVIDENCE $A_3$ | 8% | 30% | 62% |
| EVIDENCE $B_3$ | 10% | 60% | 30% |

Then, the basic probability assignments for the two items of evidence $A_3$ and $B_3$, indicated in Table-26, are combined with each other in accordance with Dempster's rule of combination so that the following combination basic probability assignment is obtained.

TABLE 27

| m ($H_1$) | m ($H_1$ $H_2$) | m ($H_2$) |
|---|---|---|
| 10% | 20% | 70% |

Further, the combination basic probability assignment indicated in Table-27 and the basic probability assignment which is updated in the preceding step and stored in the memory are combined with each other, so that the following updated basic probability assignment is obtained in step $S_{17}$.

TABLE 28

| m ($H_1$) | m ($H_1$ $H_2$) | m ($H_2$) |
|---|---|---|
| 26% | 14% | 51% |

The updated basic probability assignment indicated in Table-28 is stored in the memory.

After the updated basic probability assignment obtained in step $S_{17}$ is stored in the memory, step $S_{18}$ carries out a language process for correcting a candidate character with reference to a word dictionary. Then, step $S_{19}$ calculates the basic probability assignments for items of evidence $A_4$ and $B_4$ obtained in step $S_{18}$, so that the following basic probability assignment is obtained.

TABLE 29

| | m ($H_1$) | m ($H_1$ $H_2$) | m ($H_2$) |
|---|---|---|---|
| EVIDENCE $A_4$ | 0% | 30% | 70% |
| EVIDENCE $B_4$ | 15% | 40% | 45% |

Then, the basic probability assignments for items of evidence $A_4$ and $B_4$ are combined with each other in accordance with Dempster's rule of combination, so that the following combination basic probability assignment is obtained.

TABLE 30

| m ($H_1$) | m ($H_1$ $H_2$) | m ($H_2$) |
|---|---|---|
| 6% | 12% | 82% |

Further, the combination basic probability indicated in Table-30 and the basic probability which is updated in the preceding step and stored in the memory are combined with each other in accordance with Dempster's rule of combination, so that the following updated basic probability assignment is obtained.

TABLE 31

| $m(H_1)$ | $m(H_1 H_2)$ | $m(H_2)$ |
|---|---|---|
| 8% | 3% | 78% |

As step $S_{18}$ is a final step, the basic probability assignment, which is updated based on the information obtained in the step $S_{18}$ and indicated in Table-31, is used as the final basic probability assignment in this system. That is, the recognition result and the rank of the degree of belief are respectively determined in final step $S_{20}$ based on the basic probability assignment indicated in Table-31. According to Table-31, as the degree of belief for the second character has the maximum value, the second candidate character is output, as the recognition result, from the character recognition device 100. Then, as the upper probability with respect to $H_1$ is 11%, the rank of the degree of belief for the second character is determined to be the rank A.

Figure 9:
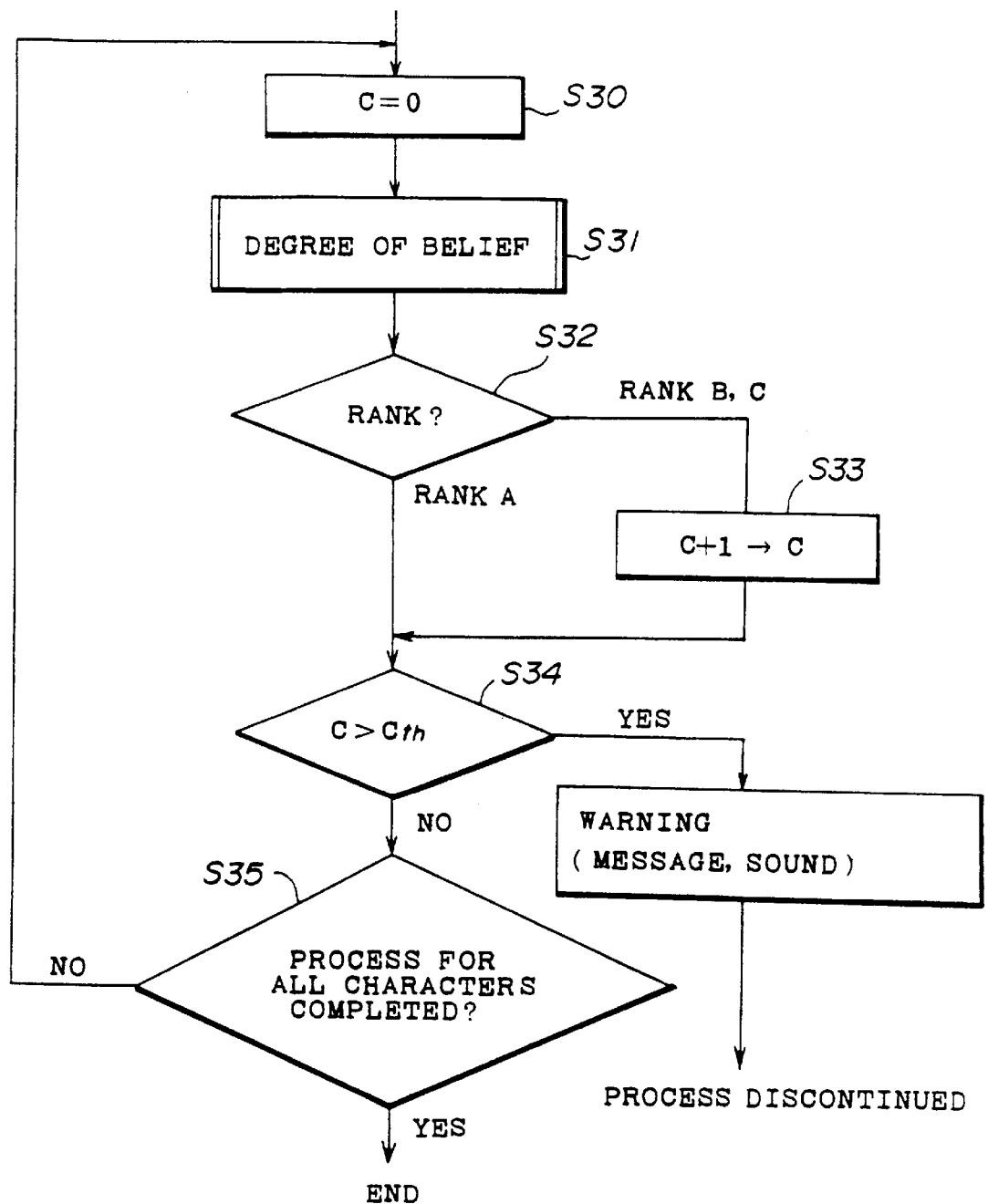
FIG. 9 is a flow chart illustrating a process for generating a warning when the number of characters having a low degree of belief is greater than a predetermined value.

FIG. 9 shows an example of a process for giving a warning to the user. Referring to FIG. 9, step $S_{30}$ initializes the counter part 109 to "0". Then, a step $S_{31}$ carries out a process for calculating the degree of belief (the basic probability assignment) for each candidate character, as has been described above. Step $S_{32}$ determines whether the degree of belief calculated in step $S_{31}$ is the rank A, B or C. When the degree of belief is low so as to be the rank B or C, step $S_{33}$ increments the counter part 109 by one. In a case where step $S_{32}$ determines that the degree of belief is the rank A or step $S_{33}$ increments the counter part 109 by one, step $S_{34}$ determines whether or not the count value of the counter part 109 is greater than a predetermined threshold value $C_{th}$. When the result obtained in the step $S_{34}$ is YES, a warning message for warning that there are many recognized characters having a low degree of belief is generated. In this case, the buzzer can also be operated to give this warning. Then after the warning message is displayed on the display unit 113, the process is discontinued.

On the other hand, when the result obtained in step $S_{34}$ is NO, a further step $S_{35}$ determines whether or not the process for all characters on the document is completed. When the result obtained in step $S_{35}$ is NO, the processes in steps $S_{31}$ through $S_{35}$ are repeated until the recognition results for all characters on the document are obtained. When the result obtained in step $S_{35}$ is YES, the process for recognizing characters is normally completed.

For example, in a case where the threshold value $C_{th}$ is 50, when the number of characters having the low degree of belief is greater than 50, the process for recognizing characters is discontinued.

According to the process as shown in FIG. 9, it is possible to prevent low quality characters used for the recognition from being supplied to this character recognition system.

A description will now be given of a modification of the second embodiment of the present invention with reference to FIG. 10.

The degree of belief which is calculated based on the information obtained in each process step (the pattern matching process, the path selecting process, the rule process and the language process), as shown in FIG. 8, is stored in the memory. Then after the process shown in FIG. 8 is completed, the recognized characters are displayed on the display unit 113 so that each recognized character having a low degree of belief (rank B and rank C) can be visualized, as shown in FIG. 3A. In this condition, when the user inputs an instruction for specifying the recognized character having the low degree of belief to this system by use of a key board, a mouse or the like, a process for displaying messages on the display unit 113, shown in FIG. 10, is carried out.

Figure 10:
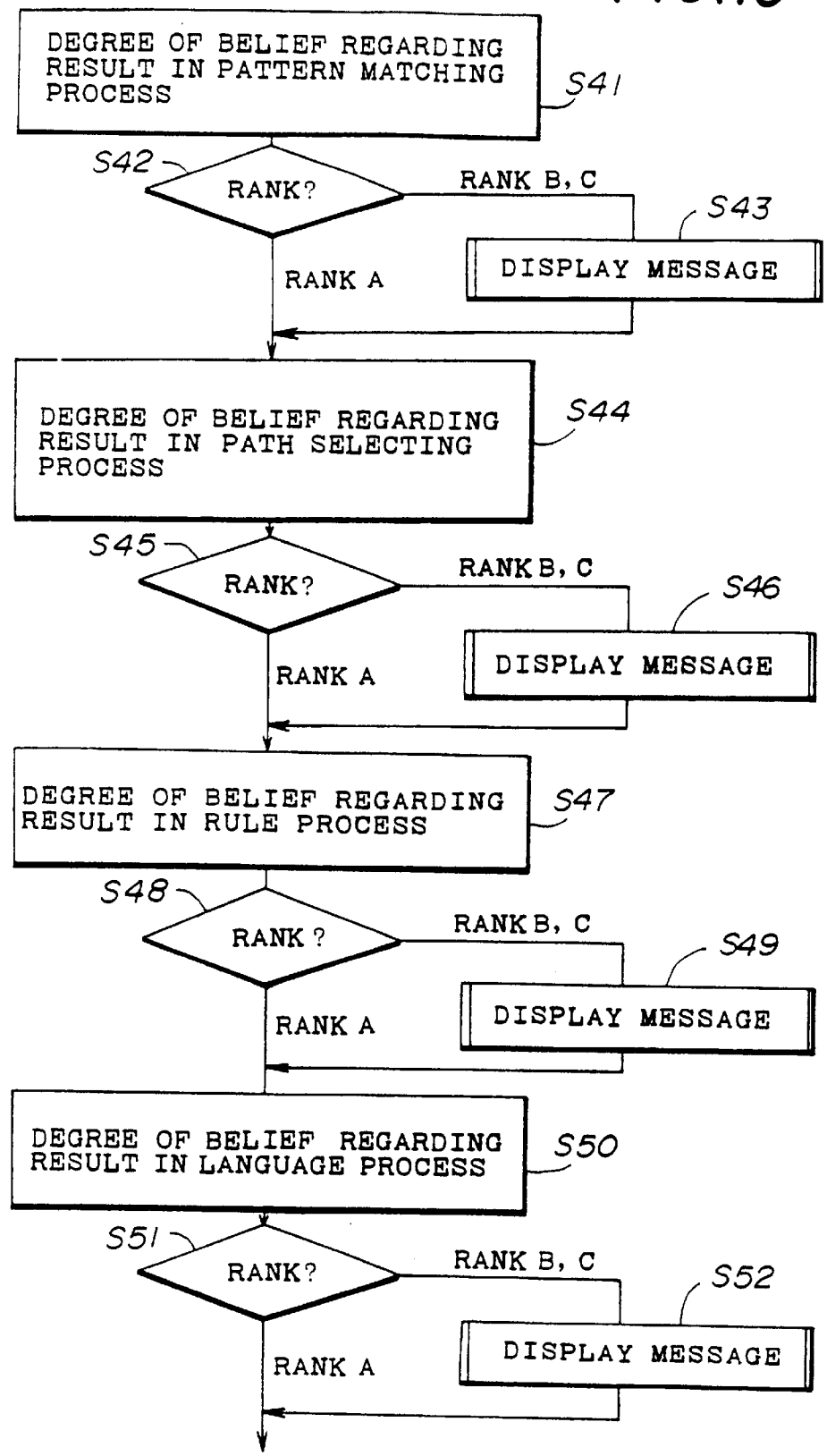
FIG. 10 is a flow chart illustrating a process for displaying messages for characters having a low degree of belief.

Referring to FIG. 10, step $S_{41}$ reads out the degree of belief, which has been calculated based on the information (the evidence) obtained in the pattern matching process for the specified recognized character, from the memory. Then step $S_{42}$ determines whether the degree of belief read out from the memory is one of the ranks A, B and C. When step $S_{42}$ determines that the degree of belief read out from the memory is either the rank B or C, step $S_{43}$ displays a message on the display unit 113. In this case, as the result obtained by the pattern matching process is doubtful, a message, for example, —PLEASE EXTRACT IMAGE FROM CHARACTERS AGAIN AND CARRY OUT LEARNING OF PATTERN DICTIONARY— is displayed.

Next, step $S_{44}$ reads out the degree of belief, which has been calculated based on the information (the evidence) obtained in the path selecting process for selecting the combination of the images of the characters, for the specified recognized characters, from the memory. Then step $S_{45}$ determines whether the degree of belief corresponding to the path selecting process is one of the ranks A, B and C. When step $S_{45}$ determines that the degree of belief is either the rank B or C, step $S_{46}$ displays a message on the display unit 113. In this case, as the result obtained by the path selecting process is doubtful, a message, for example, —PLEASE CARRYING OUT LEARNING OF PATTERN DICTIONARY— is displayed.

After this, step $S_{47}$ reads out the degree of belief, which has been calculated based on the information (the evidence) obtained in the rule process for the specified recognized character, from the memory. Then step $S_{48}$ determines whether the degree of belief corresponding to the rule process is one of the ranks A, B and C. When step $S_{48}$ determines that the degree of belief is either the rank B or C, step $S_{49}$ displays a message on the display unit 113. In this case, as the result obtained by the rule process is doubtful, a message, for example, —PLEASE ADD RULES FOR CHARACTER— is displayed.

Further, step $S_{50}$ reads out the degree of belief, which has been calculated based on the information (the evidence) obtained in the language process for the specified recognized character, from the memory. Then step $S_{51}$ determines whether the degree of belief corresponding to the language process is either the rank A, B or C. When step $S_{51}$ determines that the degree of belief corresponding to the language process is either rank B or C, step $S_{52}$ displays a message on the display unit 113. In this case, as the result obtained by the language process is doubtful, a message, for example, —PLEASE ADD INFORMATION TO WORD DICTIONARY— is displayed.

According to the above process, at least one of the above five messages is displayed for the specified recognized character which has the low degree of belief. Thus, due to the messages displayed on the display unit 113, the user can find out the means for obtaining the recognized characters which have the improved degree of belief.

A description will now be given of an example of a process for recognizing characters with reference to FIG. 11.

Figure 11:
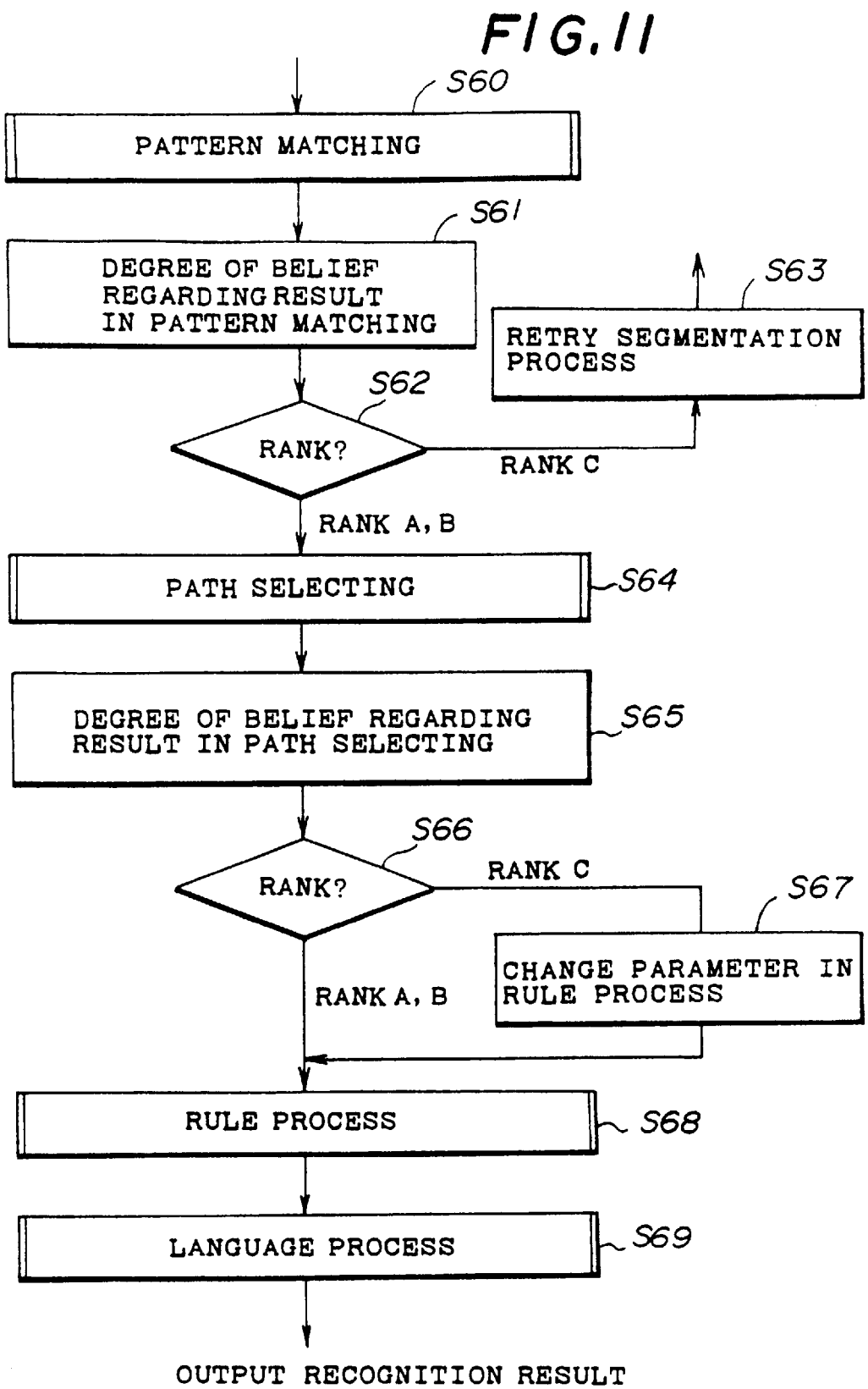
FIG. 11 is a flow chart illustrating a process for changing conditions, parameters and the like based on the degree of belief.

Referring to FIG. 11, step $S_{60}$ carries out the pattern matching process described above, then step $S_{61}$ calculates the degree of belief for each candidate character obtained by the pattern matching process in step $S_{60}$. Step $S_{62}$ determines whether the degree of belief for each candidate character is either the rank A, B or C. When step $S_{62}$ determines that the degree of belief for a candidate character is low, so as to be either the rank B or C, step $S_{63}$ supplies to the preceding process—the segmentation process—information that an image for one character has to be extracted from the character string. In this case, the image for one character is extracted from the character string again, and the pattern matching process with respect to the image for one character extracted from the characters is carried out again.

After this, step $S_{64}$ carries out the path selecting process and step $S_{65}$ calculates the degree of belief for each candidate character based on the information obtained by the path selecting process in the same manner as the process described above. Step $S_{66}$ determines whether the degree of belief for each candidate character is either the rank A, B or C. When step $S_{66}$ determines that the degree of belief for a candidate character is either the rank B or C, step $S_{67}$ supplies to the following process—the rule process—information that parameters in the rule process have to be changed. Then, step $S_{68}$ carries out the rule process in which the parameters are changed, and step $S_{69}$ carries out the language process in the same manner as that described above.

According to the process shown in FIG. 11, when the degree of belief obtained in a process is less than a predetermined value, conditions, parameters and the like in the preceding and/or the following process are changed. Thus, it is possible to decrease the process time required for recognizing characters and to improve the probability that the recognized character is correct.

A description will now be given of a third embodiment of the present invention.

Figure 12:
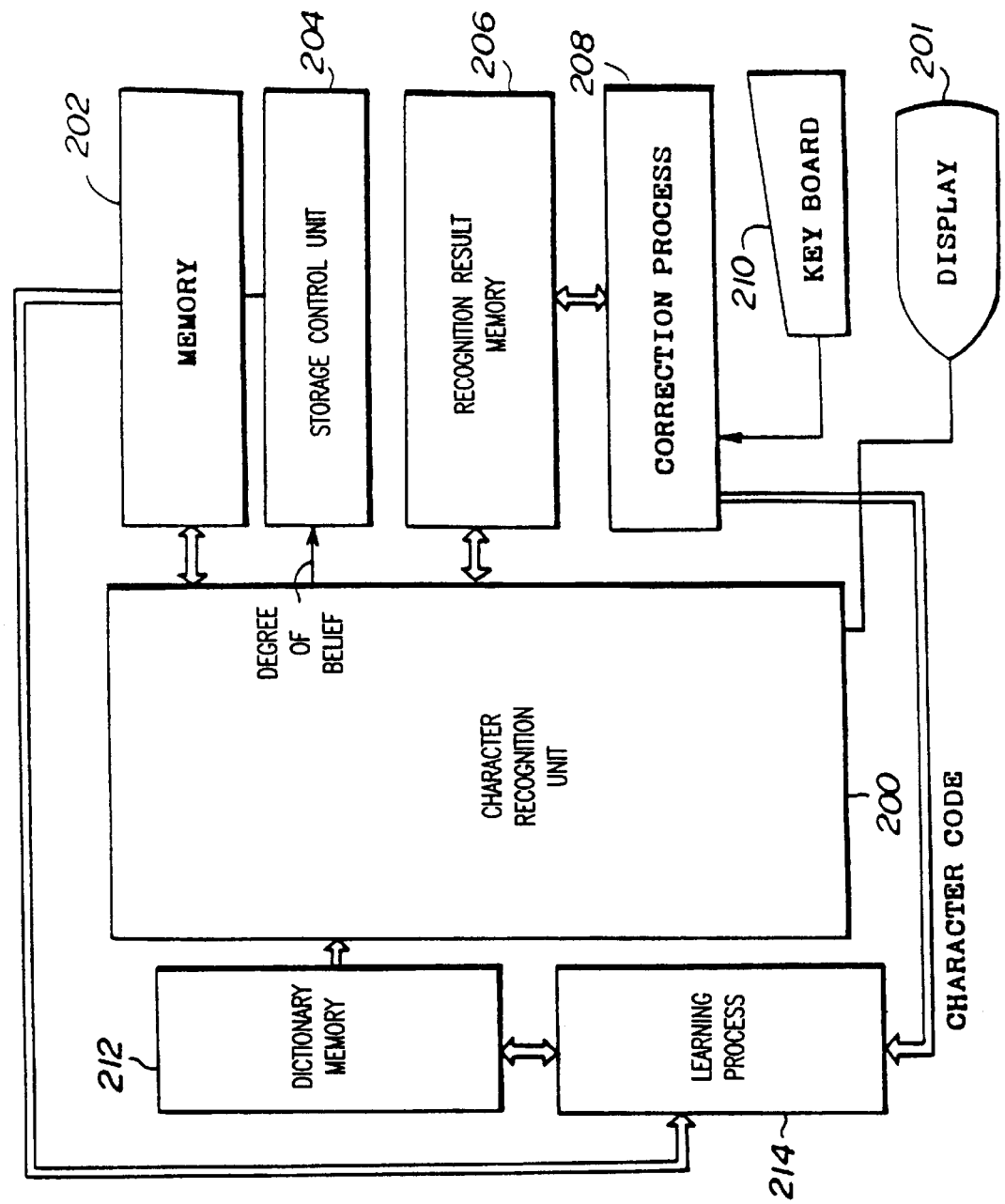
FIG. 12 is a block diagram illustrating a third embodiment of a character recognition system according to the present invention.

FIG. 12 is a block diagram illustrating a structure of a character recognition system according to the third embodiment of the present invention. Referring to FIG. 12, a character recognition unit 200 includes a scanner. The character recognition unit 200 carries out the process for recognizing characters corresponding to an image output from the scanner, in the same manner as the system shown in FIGS. 1 or 5. A display unit 201 displays the recognition result supplied from the character recognition unit 200. A memory 202 stores feature data for character patterns extracted from the input characters by a pattern matching process in the character recognition unit 200. The memory 202 can also store character patterns which are normalized by the normalizing process part in the character recognition unit 200. In the third embodiment, the feature data of the character patterns are stored in the memory 202. The character recognition unit 200 calculates the degree of belief for each character and supplies the degree of belief for each character to a storage control unit 204. When the degree of belief for the character is low, so as to be either the rank B or C, the storage control unit 204 stores the feature data of character patterns having the degree of belief of either the rank B or C. A recognition result memory 206 stores the recognized characters (the recognition results) and the degree of belief for each recognized character which is supplied from the character recognition unit 200. The user inputs the information for instruction and the like from a key board 210. For example, when the recognition result is revised, the user inputs the correct character from the key board 201. A correcting unit 208 corrects the recognition results in accordance with instructions supplied from the key board 210. A dictionary memory 212 has previously stored the dictionary used in the pattern matching process. A learning unit 214 carries out a learning of the dictionary stored in the dictionary memory 212.

Figure 13:
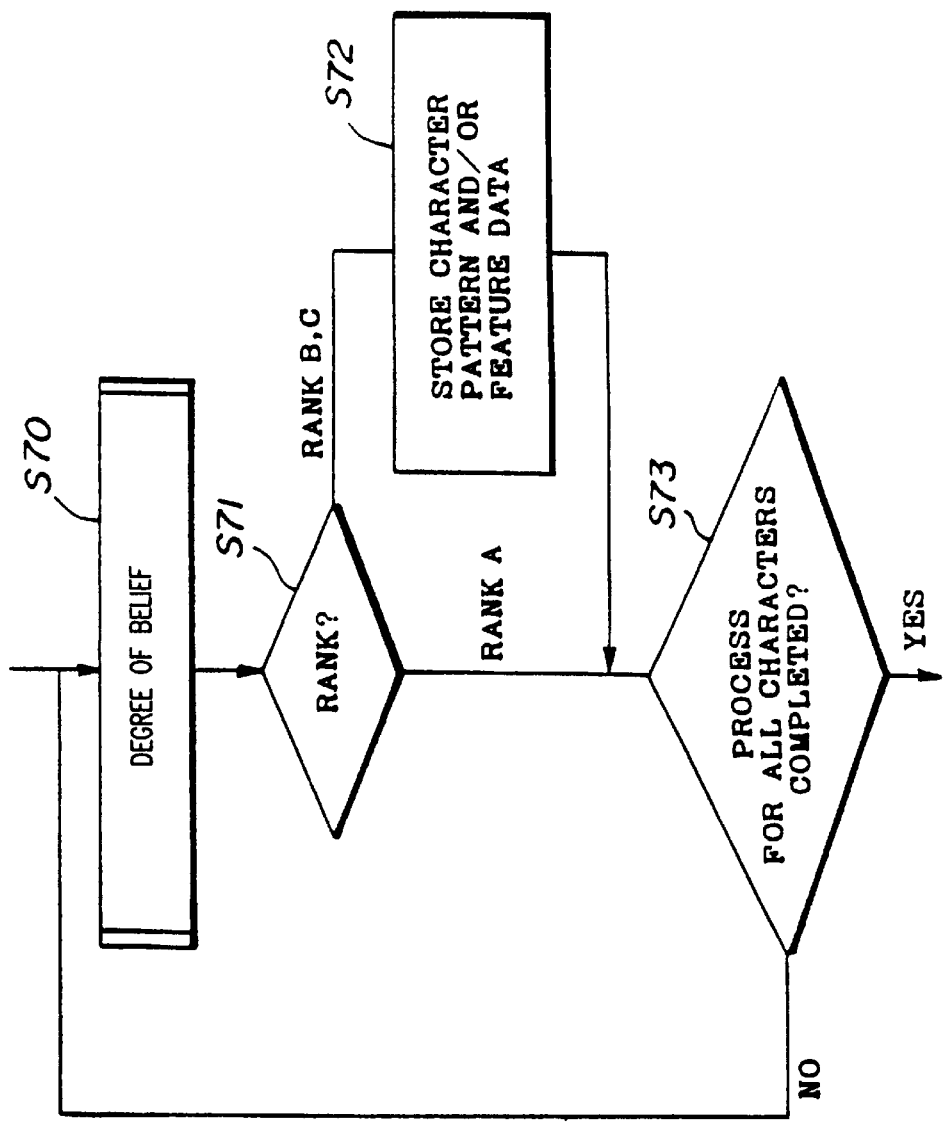
FIG. 13 is a flow chart illustrating a process for storing character patterns and/or feature data of character patterns regarding characters having a low degree of belief.

The feature data for each character pattern is stored in the memory 202 in accordance with the process shown in FIG. 13.

Referring to FIG. 13, step $S_{70}$ calculates the degree of belief for each recognized character. Then step $S_{71}$ determines whether the degree of belief for the recognized character is one of the ranks A, B and C. When step $S_{71}$ determines the degree of belief for the recognized character is either the rank B or C, the feature data for the recognized character having the degree of belief of the rank B or C is stored in the memory 202. Then step $S_{73}$ determines whether or not the process for all recognized characters is completed. When the result in step $S_{73}$ is NO, steps $S_{70}$, $S_{71}$, $S_{72}$ and $S_{73}$ are repeated until the process for all recognized characters is completed. On the other hand, when the result obtained in step $S_{73}$ is YES, the process for storing the feature data of the recognized characters in the memory 202 is completed.

Learning of the dictionary stored in the dictionary memory 212 is carried out as follows.

In a condition where the recognized characters and the degree of belief for each recognized character are displayed on the display unit 201, the correcting unit 208 corrects one recognized character based on the instruction which is input from the key board 210 by the user. In this case, the correcting unit 208 supplies the rank of the degree of belief and a code for the correct character to the learning unit 214. When the learning unit 214 determines that the rank of the degree of belief for the recognized character is either B or C, the learning unit 214 reads out from the memory 202 the feature data of the recognized character which is corrected. Then the learning unit 214 carries out the learning of the dictionary stored in the dictionary memory 212 based on the feature date of the recognized character read out from the memory 202.

In general, it is required that the dictionary with respect to the recognized character having a low degree of belief be learned. Thus, according to the learning process in the third embodiment, as the learning process is carried out by use of the feature data of only the recognized character having a low degree of belief, so as to be either the rank B or C, the learning process is efficiently carried out. That is, the process time required for the learning process can be decreased.

The present invention is not limited to the aforementioned embodiments, and variations and modifications may be made without departing from the scope of the claimed invention.

What is claimed is:

1. A method of improving an optical character recognition, comprising the steps of:

a) inputting image data which represents characters;

b) generating a plurality of qualitatively distinct recognition results for each of said characters based upon a plurality of distinct processes which rely upon independent characteristics for recognizing said characters, said qualitatively distinct recognition results defining certainty factors and including ranks and probabilities;

c) converting certain of said certainty factors to converted certainty factors; and d) determining a degree of reliability for each of said characters based upon said converted certainty factors.

2. A method according to claim 1, wherein step (c) comprises the steps of:

(1) generating converted certainty factors based on said qualitatively distinct recognition results obtained by said distinct processes, each of said converted certainty factors describing certainty with respect to the result obtained in each of said distinct processes carried out in said step (b);

(2) combining the converted certainty factors which are obtained as a result of said distinct processes so as to generate combined certainty data, where the converted certainty factors are those which were generated in said step (c)(1); and (3) generating said degree of reliability with respect to each character based on the combined certainty data obtained in said step (c)(2).

3. A method as claimed in claim 2, wherein said step (c)(1) includes a first step of calculating a possibility distribution formed of a plurality of probabilities, each of which is a probability that a hypothesis with respect to the result generated in each of said distinct processes is true, and a second step of calculating a Dempster-Shafer's basic probability assignment data based on the possibility distribution calculated in said first step with respect to the result obtained in each of said distinct processes, said Dempster-Shafer's basic probability assignment being the result in each of said distinct processes corresponding to the converted certainty factors.

4. A method as claimed in claim 3, wherein said step (c)(2) includes a step of combining the Dempster-Shafer's basic probability assignment data for respective results obtained in said distinct processes with each other in accordance with Dempster's rule of combination.

5. A method as claimed in claim 4, wherein said step (c)(3) includes a step of calculating a lower probability based on the combined data calculated in accordance with Dempster's rule of combination, said lower probability describing a probability that the hypothesis with respect to the recognition result is true and corresponding to the certainty factor for the recognition result.

6. A method as claimed in claim 4, wherein said step (c)(3) includes a step of calculating an upper probability based on the combined data calculated in accordance with Dempster's rule of combination, said upper probability describing a probability that the hypothesis with respect to the recognition result is plausible and corresponding to the certainty factor for the recognition result.

7. A method as claimed in claim 2, wherein said step (c)(2) includes the step of combining the converted certainty factors with each other after the converted certainty factors are generated for said qualitatively distinct recognition results in all of the distinct processes in said step (c)(1).

8. A method as claimed in claim 2, wherein said step (c)(2) includes the step of combining the converted certainty factors for the result in each of said distinct processes with combined data which has been previously obtained whenever the converted certainty factors for the result in each of said plurality of processes is generated in step (c)(1).

9. A method as claimed in claim 2, wherein said step (c) further comprises a step of (4) determining whether or not the independent result in each of said distinct processes is used for recognizing a character based on the converted certainty factors generated with respect to each of the distinct processes.

10. A method as claimed in claim 2, comprising the further steps of:

generating said decree of reliability in each of said distinct processes based on the converted certainty factors obtained in said step (c)(1); and outputting a message regarding the result in each of said distinct processes with respect to the recognition result for each character, said message being based on the certainty factor for the result in each of said distinct processes.

11. A method as claimed in claim 2, comprising the further steps of:

generating a certainty factor for the result in at least one of said distinct processes based on the obtained in said step (c)(1); and changing a condition which is used for recognizing the characters in the recognition process based on the certainty factor for the result in at least one of said distinct processes.

12. A method as claimed in claim 1, wherein said step (d) includes the step displaying the recognition result for each character and the certainty factor with respect to the recognition result.

13. A method as claimed in claim 12, wherein the displaying step comprises the step of displaying the recognition result so that a visual condition of a displayed recognition result is changed based on the certainty factor.

14. A method as claimed in claim 12, wherein the displaying step comprises the step of displaying a character corresponding to the certainty factor with respect to the recognition result.

15. A method as claimed in claim 1, wherein said step (d) includes the step of printing on a sheet the recognition result for each character and the certainty factor with respect to the recognition result.

16. A method as claimed in claim 15, wherein said printing step includes the step of printing the recognition result so that a visual condition of a printed recognition result is changed based on the certainty factor.

17. A method as claim in claim 15, wherein said printing step includes the step of printing a character corresponding to the certainty factor with respect to the recognition result.

18. A method as claimed in claim 1, comprising the further steps of:

(e) counting the number of said qualitatively distinct recognition results in which the certainty factor is equal to or less than a predetermined value so as to obtain a counting value; and (f) generating a warning when the counting value obtained in said step (e) is greater than a predetermined threshold value.

19. A method as claimed in claim 1, comprising the further steps of:

(e) counting the number of said qualitatively distinct recognition results in which the certainty factor is equal to or less than a predetermined value so as to obtain a counting value; and (f) discontinuing said step (b) when the counting value obtained in said step (e) is greater than a predetermined threshold value.

20. A method as claimed in claim 1, comprising the further steps of:

storing a character pattern and/or feature data of the recognition result with respect to each character in storage means when the certainty factor of the recognition result is equal to or less than a predetermined value; and carrying out a learning of a dictionary based on the character pattern and/or feature data of the recognition result with respect to each character stored in said storage means, said dictionary being used in said pattern matching process.

21. A method as claimed in claim 1, wherein, said step (b) includes (1) a segmentation process which extracts image data for each character from said input image data, (2) a pattern matching process in which a characteristic feature derived from a character to be recognized is compared with a stored reference feature so as to compute a degree of similarity, (3) a path selecting process with which an optimum combination of images for the respective characters in the input image data are selected, (4) a rule process which applies predetermined rules regarding relationships of respective characters in the input image data and characteristics of respective characters in the input image data, and (5) a language process with which a morphological analysis is carried out with respect to the respective characters in the input image data.

22. A method as claimed in claim 1, further comprising a step of outputting the qualitatively distinct recognition result for each character and the certainty factor of the recognition result.

23. An apparatus for recognizing characters, comprising:
a) input means for inputting image data which represents characters;
b) recognizing means for generating a plurality of qualitatively distinct recognition outputs for each of said characters based upon a plurality of distinct processes which rely upon independent characteristics for recognizing said characters, said qualitatively distinct recognition outputs defining certainty factors and including ranks and probabilities;
c) converting means for converting certain of said certainty factors to converted certainty factors; and
d) determining means for determining a degree of reliability for each of said characters based upon said converted certainty factors.

24. An apparatus according to claim 23, wherein said converting means further comprises:
(1) means for generating converted certainty factors based on said qualitatively distinct recognition results obtained by said distinct processes, each of said converted certainty factors describing certainty with respect to the result obtained by each of said distinct processing means;
(2) means for combining the converted certainty factors which are obtained by said distinct processing means so as to generate combined certainty data, where the converted certainty factors are those which were generated by said converted certainty factors generating means; and
(3) means for generating said degree of said reliability with respect to each character based on the combined certainty data obtained by said converted certainty factors combining means.

25. An apparatus as claimed in claim 24, wherein said certainty factor determining means further comprises means for determining whether or not the independent result in each of said distinct processing means is used for recognizing a character based on the converted certainty factors generated with respect to each of the distinct processing means.

26. An apparatus as claimed in claim 24, further comprising:
means for generating a certainty factor for the result in each of said distinct processing means based on the converted certainty factors obtained by said certainty data item generating means in said certainty factor generating means; and
message output means for outputting a message regarding the result in each of said distinct processing means with respect to the recognition result for each character, said message being based on the certainty factor for the result in each of said distinct processing means.

27. An apparatus as claimed in claim 24, further comprising:
means for generating a certainty factor for the result in at least one of said distinct processing means based on the certainty data obtained by said certainty data item generating means in said certainty factor generating means; and
changing means for changing a condition which is used for recognizing the characters in the recognizing means based on the certainly factor for the result in at least one of said distinct processing means.

28. An apparatus as claimed in claim 23, wherein said outputting means includes display means for displaying the recognition result for each character and the certainty factor with respect to the recognition result.

29. An apparatus as claimed in claim 28, wherein said display means includes means for displaying the recognition result so that a visual condition of a displayed recognition result is changed based on the certainty factor.

30. An apparatus as claimed in claim 28, wherein said display means includes means for displaying a character corresponding to the certainty factor with respect to the recognition result.

31. An apparatus as claimed in claim 23, wherein said outputting means includes printing means for printing on a sheet the recognition result for each character and the certainty factor with respect to the recognition result.

32. A method as claimed in claim 31, wherein said printing means prints the recognition result so that a visual condition of a printed recognition result is changed based on the certainty factor.

33. A method as claimed in claim 31, wherein said printing means prints a character corresponding to the certainty factor with respect to the recognition result.

34. An apparatus as claimed in claim 23, further comprising:
counter means for counting the number of said qualitatively distinct recognition results in which the certainty factor is equal to or less than a predetermined value so as to provide a counting value; and
warning means for generating a warning when said counting value provided by said counter means is greater than a predetermined threshold value.

35. An apparatus as claimed in claim 23, further comprising:
counter means for counting the number of recognition results in which the certainty factor is equal to or less than a predetermined value so as to obtain a counting value; and
discontinuation means for discontinuing said recognizing means when the counting value provided by said counter means is greater than a predetermined threshold value.

36. An apparatus as claim in claim 23, further comprising:
storage means for storing a character pattern and/or feature data of the recognition result with respect to each character when the certainty factor of the recognition result is equal to or less than a predetermined value; and learning means for carrying out a learning process of a dictionary, based on the character pattern and/or feature data of the recognition result with respect to each character stored in said storage means, said dictionary being used by said pattern matching process unit of said recognizing means.

37. An apparatus according to claim 23, wherein, said recognizing means further comprises:

(1) a segmentation process unit which extracts image data for each character from said input image data, (2) a pattern matching process unit in which a characteristic feature derived from a character to be recognized is compared with a stored reference feature so as to compute a degree of similarity, (3) a path selecting process unit with which an optimum combination of images for the respective characters in the input image data are selected, (4) a rule process unit which applies predetermined rules regarding relationships of respective characters in the input image data and characteristics of respective characters in the input image data, and (5) a language process unit with which a morphological analysis is carried out with respect to the respective characters in the input image data.

38. An apparatus according to claim 23, further comprising outputting means for outputting both the recognition result for each character as well as the associated certainty factor.

39. A method for recognizing characters, comprising the steps of:

(a) inputting image data for characters;

(b) carrying out a recognition process for recognizing each of the characters based on the image data input in said step (a), said recognition process including at least two of the following distinct processes each of which is applied to each character:

(1) a segmentation process which extracts image data for each character from said input image data, (2) a pattern matching process in which a characteristic feature derived from a character to be recognized is compared with a stored reference feature so as to compute a degree of similarity, (3) a path selecting process with which an optimum combination of images for the respective characters in the input image are selected, (4) a rule process which applies predetermined rules regarding relationships of respective characters in the input image data and characteristics of respective characters in the input image data, and (5) a language process with which a morphological analysis is carried out with respect to the respective characters in the input image data, each of said distinct processes generating a qualitatively distinct result regarding each character, each said qualitatively distinct result defining confidence factors, and wherein a recognition result with respect to each character is determined based on the qualitatively distinct results generated in said distinct processes;

(c) generating converted certainty factors based on said qualitatively distinct results obtained by said distinct processes, each of said converted certainty factors describing certainty with respect to the result obtained in each of said distinct processes carried out in said step (b); and (d) performing operations of the converted certainty factors corresponding to said plurality of distinct processes so as to generate combined certainty data, the converted certainty factors being those generated in said step (c), the combined certainty data describing certainty with respect to the recognition result determined in said step (b).

40. An apparatus for recognizing characters, the apparatus comprising:

(a) input means for inputting image data for characters;

(b) recognizing means for recognizing each of the characters based on the image data input by said input means, said recognizing means including at least two of the following distinct processing means each of which operates on each character:

(1) a segmentation process unit which extracts image data for each character from said input image data, (2) a pattern matching process unit in which a characteristic feature derived from a character to be recognized is compared with a stored reference feature so as to compute a degree of similarity, (3) a path selecting process unit with which an optimum combination of images for the respective characters in the input image data are selected, (4) a rule process unit which applies predetermined rules regarding relationships of respective characters in the input image data and characteristics of respective characters in the input image data, and (5) a language process unit with which a morphological analysis is carried out with respect to the respective characters in the input image data, each of said distinct processing means generating a qualitatively distinct result regarding each character, each said qualitatively distinct result defining confidence factors, and wherein a recognition result with respect to each character is determined based on the qualitatively distinct results generated in said distinct processes;

(c) certainty data item generating means for generating converted certainty factors based on said qualitatively distinct results obtained by said plurality of distinct processing means, each of said converted certainty factors describing certainty with respect to the result obtained by each of said distinct processing means; and (d) operation means for performing operations on the converted certainty factors corresponding to said distinct processing means so as to generate combined certainty data, the converted certainty factors being those which were generated by said certainty data item generating means, the combined certainty data describing certainty with respect to the recognition result determined by said recognizing means.

* * * * *

UNITED STATES PATENT AND TRADEMARK OFFICE
CERTIFICATE OF CORRECTION

PATENT NO. : 5,966,464
DATED      : October 12, 1999
INVENTOR(S) : Kenji Kojima

It is certified that error appears in the above-indentified patent and that said Letters Patent is hereby corrected as shown below:

On the title page: Item [30] , change "Jun. 19, 1990" to --
Jun. 11, 1999--.

Signed and Sealed this

Thirteenth Day of March, 2001

Attest:

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO. : 5,966,464
DATED : October 12, 1999
INVENTOR(S) : Kenji Kojima

It is certified that error appears in the above-identified patent and that said Letters Patent is hereby corrected as shown below:

Title page,
Item [73], change "RCOH Company, Japan" to -- Ricoh Company, Ltd., Japan --.

Item [30], change "Jun. 19, 1990" to -- Jun. 11, 1990 --.

Signed and Sealed this

Sixth Day of November, 2001

Attest:

NICHOLAS P. GODICI
Attesting Officer   Acting Director of the United States Patent and Trademark Office